US012246536B2

(12) United States Patent
Fujii et al.

(10) Patent No.: US 12,246,536 B2
(45) Date of Patent: Mar. 11, 2025

(54) LIQUID EJECTION HEAD SUBSTRATE, LIQUID EJECTION HEAD, AND LIQUID EJECTION APPARATUS

(71) Applicant: CANON KABUSHIKI KAISHA, Tokyo (JP)

(72) Inventors: Yasuo Fujii, Kanagawa (JP); Yasuhiro Soeda, Kanagawa (JP); Yosuke Miura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 322 days.

(21) Appl. No.: 17/537,804

(22) Filed: Nov. 30, 2021

(65) Prior Publication Data

US 2022/0184952 A1 Jun. 16, 2022

(30) Foreign Application Priority Data

Dec. 14, 2020 (JP) ................................ 2020-206568

(51) Int. Cl.
*B41J 2/14* (2006.01)

(52) U.S. Cl.
CPC ................................ *B41J 2/14112* (2013.01)

(58) Field of Classification Search
CPC ................ B41J 2/14112; B41J 2/14032; B41J 2/14016; B41J 2/14088; B41J 2/04563; B41J 2/0458; B41J 2/04541; B41J 2/14129; B41J 2/1412; B41J 2/14137; B41J 2002/14177; B41J 2002/14185
See application file for complete search history.

(56) References Cited

U.S. PATENT DOCUMENTS

| | | | |
|---|---|---|---|
| 7,950,769 | B2 | 5/2011 | Sakai et al. |
| 8,123,330 | B2 | 2/2012 | Sakai et al. |
| 8,491,087 | B2 | 7/2013 | Sakai et al. |
| 10,421,272 | B2 | 9/2019 | Ishida et al. |
| 10,434,777 | B2 | 10/2019 | Kato et al. |
| 10,960,665 | B2 | 3/2021 | Nomura et al. |
| 11,104,126 | B2 | 8/2021 | Kato et al. |
| 11,383,515 | B2 | 7/2022 | Sakuma et al. |

(Continued)

FOREIGN PATENT DOCUMENTS

| | | |
|---|---|---|
| JP | 7-148927 A | 6/1995 |
| JP | 2004-150897 A | 5/2004 |

(Continued)

*Primary Examiner* — Kristal Feggins
(74) *Attorney, Agent, or Firm* — VENABLE LLP

(57) ABSTRACT

Provided is a technique that enables voltages to be applied, with high precision, to an electrode layer for inhibition and removal of koge while suppressing increase in the size a substrate. A liquid ejection head substrate includes: electrothermal conversion elements that apply heat to a liquid; an upper electrode part in which a plurality of upper electrodes that protect the electrothermal conversion elements are formed at positions where the upper electrodes come into contact with the liquid; a counter electrode part which is provided to correspond to the upper electrode part and in which a plurality of counter electrodes are formed to be electrically connectable to the upper electrodes via the liquid; and a generation unit that generates a voltage to be applied to at least one of the upper electrode part and the counter electrode part.

8 Claims, 15 Drawing Sheets

(56) References Cited

U.S. PATENT DOCUMENTS

| | | | |
|---|---|---|---|
| 2007/0146428 A1 | 6/2007 | Sakai et al. | |
| 2008/0002000 A1 | 1/2008 | Cornell et al. | |
| 2011/0199421 A1 | 8/2011 | Sakai et al. | |
| 2012/0105537 A1 | 5/2012 | Sakai et al. | |
| 2015/0336385 A1* | 11/2015 | Kato | B41J 2/16523 347/26 |
| 2018/0304622 A1 | 10/2018 | Funabashi et al. | |
| 2018/0345665 A1 | 12/2018 | Kato et al. | |
| 2019/0023005 A1 | 1/2019 | Ishida et al. | |
| 2019/0299600 A1 | 10/2019 | Nomura et al. | |
| 2020/0114643 A1 | 4/2020 | Kato et al. | |
| 2020/0338888 A1 | 10/2020 | Sakuma et al. | |

FOREIGN PATENT DOCUMENTS

| | | |
|---|---|---|
| JP | 2008-105364 A | 5/2008 |
| JP | 2018-1748 A | 1/2018 |
| JP | 2018-176697 A | 11/2018 |
| JP | 2018-202718 A | 12/2018 |
| JP | 2019-6108 A | 1/2019 |
| JP | 2019-18511 A | 2/2019 |
| JP | 2019-171670 A | 10/2019 |
| JP | 2020-59254 A | 4/2020 |
| JP | 2020-179526 A | 11/2020 |

* cited by examiner

LIQUID EJECTION HEAD SUBSTRATE, LIQUID EJECTION HEAD, AND LIQUID EJECTION APPARATUS

BACKGROUND OF THE INVENTION

Field of the Invention

The present invention relates to a liquid ejection head substrate widely applicable as, for example, a recording head substrate that can eject ink using an inkjet method, a liquid ejection head employing the liquid ejection head substrate, and a liquid ejection apparatus employing the liquid ejection head.

Description of the Related Art

In a liquid ejection head employing a method in which a voltage is applied to heating resistor elements to cause film boiling in a liquid and eject the liquid by utilizing the growing energy of the bubbles, problematic kogation may occur in a case where the liquid is an ink containing a color material or the like. Kogation is a phenomenon where heat generated by the heating resistor elements causes a thermally soluble ink component to decompose, change in property, or do the like and consequently attach to the heating resistor elements or a coating covering the surfaces of the heating resistor elements as residues, or koge. The occurrence of kogation contributes to lowering the heat conductivity from the heating resistor elements to the liquid and causing unstable generation of bubbles and accordingly unstable ejection operation.

Japanese Patent Laid-Open No. 2008-105364 discloses a technique in which a surface of an upper protection layer of a heating resistor element is provided with an electrode layer formed using a material that can be eluted into a liquid through an electrochemical reaction, and attached koge is removed by applying a voltage to the electrode layer.

In the technique disclosed in Japanese Patent Laid-Open No. 2008-105364, the voltage to be applied to the electrode layer is generated by a voltage generating part provided separately from the liquid ejection head substrate where the heating resistor element, the upper protection layer, and the like are formed. For this reason, a voltage drops in the interconnection from the voltage generating part to the electrode layer, which may hinder a precise voltage for suppressing or removing koge from being applied to the electrode layer. Also, a voltage value appropriate for inhibiting or removing koge may differ depending on the kind of ink. For this reason, in order to have different voltage values for the respective kinds of ink in a configuration capable of ejecting different kinds of ink, the substrate may need electrodes for applying voltages for the respective kinds of ink, and this may increase the size of the substrate.

SUMMARY OF THE INVENTION

The present invention has been made in view of the above problems and provides a technique that enables a precise voltage to be applied to an electrode layer while suppressing increase in the size of a substrate.

In the first aspect of the present invention, there is provided a liquid ejection head substrate comprising:

- electrothermal conversion elements that apply heat to a liquid;
- an upper electrode part in which a plurality of upper electrodes that protect the electrothermal conversion elements are formed at positions where the upper electrodes come into contact with the liquid;
- a counter electrode part which is provided to correspond to the upper electrode part and in which a plurality of counter electrodes are formed to be electrically connectable to the upper electrodes via the liquid; and
- a generation unit that generates a voltage to be applied to at least one of the upper electrode part and the counter electrode part.

In the second aspect of the present invention, there is provided a liquid ejection head comprising:

- a liquid ejection head substrate having electrothermal conversion elements that apply heat to a liquid, an upper electrode part in which a plurality of upper electrodes that protect the electrothermal conversion elements are formed at positions where the upper electrodes come into contact with the liquid, a counter electrode part which is provided to correspond to the upper electrode part and in which a plurality of counter electrodes are formed to be electrically connectable to the upper electrodes via the liquid, and a generation unit that generates a voltage to be applied to at least one of the upper electrode part and the counter electrode part, wherein
- the liquid ejection head boils the liquid with heat energy exerted by the electrothermal conversion elements, and ejects the liquid from ejection ports with force of bubbles generated by the boiling.

In the third aspect of the present invention, there is provided a liquid ejection apparatus comprising:

- a liquid ejection head substrate having electrothermal conversion elements that apply heat to a liquid, an upper electrode part in which a plurality of upper electrodes that protect the electrothermal conversion elements are formed at positions where the upper electrodes come into contact with the liquid, a counter electrode part which is provided to correspond to the upper electrode part and in which a plurality of counter electrodes are formed to be electrically connectable to the upper electrodes via the liquid, and a generation unit that generates a voltage to be applied to at least one of the upper electrode part and the counter electrode part, wherein
- the liquid ejection apparatus performs predetermined processing by boiling the liquid with heat energy exerted by the electrothermal conversion elements, and using the liquid ejected with force of bubbles generated by the boiling from a liquid ejection head that ejects the liquid from ejection ports.

The present invention enables a precise voltage to be applied to an electrode layer (upper electrodes, counter electrodes) while suppressing increase in the size of a substrate.

Further features of the present invention will become apparent from the following description of exemplary embodiments with reference to the attached drawings.

DESCRIPTION OF THE EMBODIMENTS

With reference to the drawings attached hereto, the following gives detailed descriptions of example embodiments of a liquid ejection head substrate, a liquid ejection head, and a liquid ejection apparatus. Note that the following embodiments do not limit the present invention and that all the combinations of features described in the embodiments are not necessarily essential as the solving means of the present invention. Also, the relative positions, shapes, and the like of the constituents described in the embodiments are merely examples unless there is a statement particularly giving such limitations, and there is no intension of limiting the scope of the present invention only to them.

First Embodiment

Figure 1:
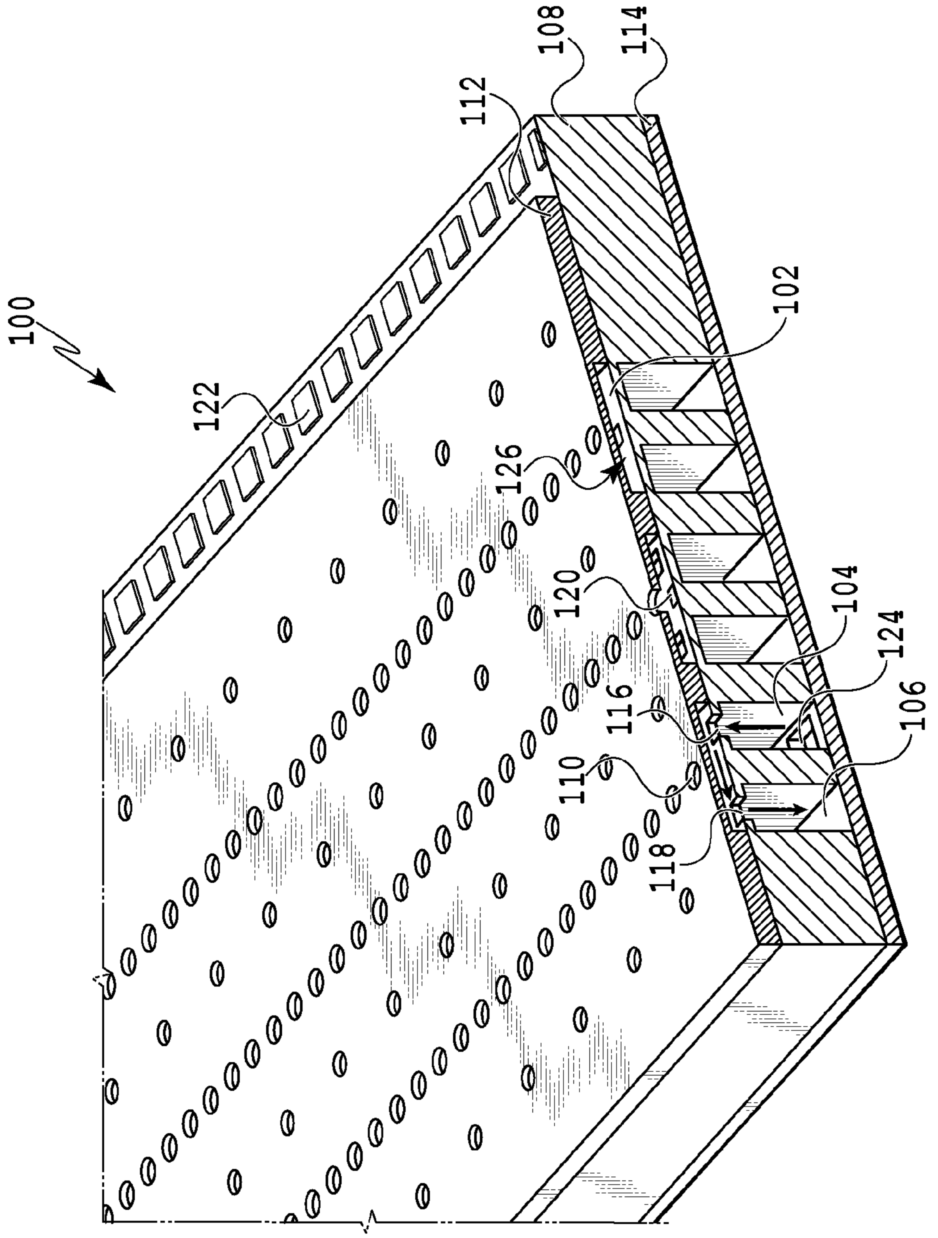
FIG. 1 is a schematic configuration diagram of a liquid ejection head employing a liquid ejection head substrate.
Figure 2:
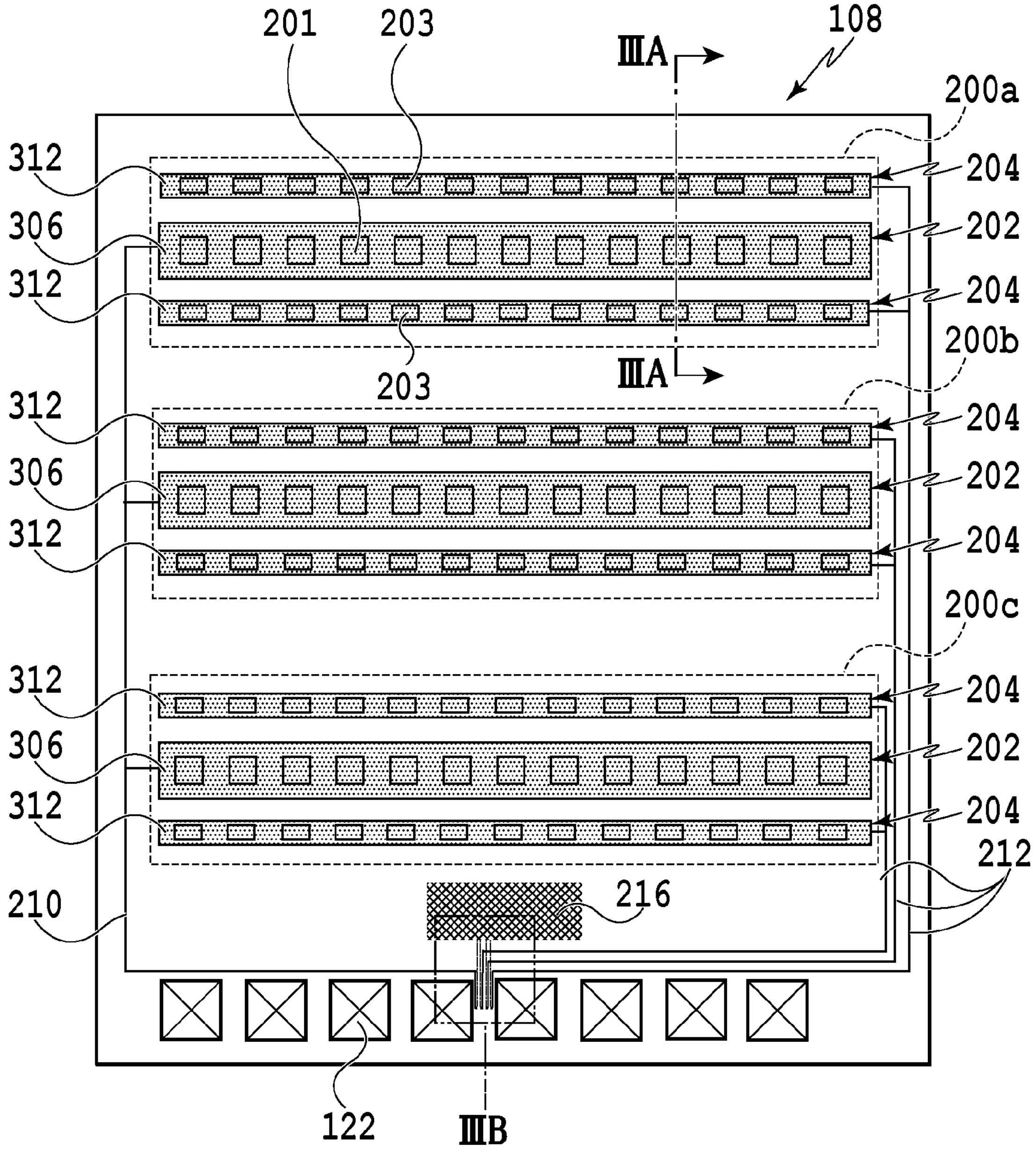
FIG. 2 is a plan view of the liquid ejection head substrate.

First, with reference to FIGS. 1 to 5, a liquid ejection head substrate of a first embodiment is described. FIG. 1 is a schematic configuration diagram of a liquid ejection head employing the liquid ejection head substrate of the first embodiment. FIG. 2 is a plan view schematically showing the configuration of the liquid ejection head substrate. FIG. 3A is a sectional view taken along the line IIIA-IIIA in FIG. 2, and FIG. 3B is a diagram enlarging the frame IIIB in FIG. 2. Note that FIGS. 2, 3A, and 3B do not show part of the configuration to facilitate understanding.

A liquid ejection head 100 includes a liquid ejection head substrate (hereinafter also referred to simply as a "substrate") 108 having formed therein supply channels 104 for supplying a liquid to pressure chambers 102 (to be described later) and collection channels 106 for collecting the liquid from the pressure chambers 102. A flow channel formation member 112 is provided on a first surface of the substrate 108, the flow channel formation member 112 having formed therein ejection port rows each with a plurality of ejection ports 110 for liquid ejection. Also, a cover plate 114 is provided on a second surface of the substrate 108 opposite from the first surface.

The supply channels 104 and the collection channels 106 extend in the direction in which the ejection ports 110 in the flow channel formation member 112 are arranged. In the first surface of the substrate 108, a plurality of supply ports 116 are arranged in the direction in which the ejection ports 110 are arranged and communicate with the corresponding supply channels 104. Further, in the first surface of the substrate 108, a plurality of collection ports 118 are arranged in the direction in which the ejection ports 110 are arranged and communicate with the corresponding collection channels 106.

At the first surface of the substrate 108, heat operation parts 120 are formed at positions corresponding to the ejection ports 110 to generate bubbles in the liquid using heat energy. Each heat operation part 120 includes a heating resistor element 304 (see FIG. 3A) for causing the liquid to be ejected and an upper electrode 201 (to be described later) for protecting the heating resistor element 304. The heat operation part 120 is located inside the pressure chamber 102 formed in the flow channel formation member 112. The heating resistor element 304 (also referred to as an electrothermal conversion element) boils the liquid inside the pressure chamber 102, and using the force of bubbles generated by the boiling, causes the liquid to be ejected through the ejection port 110. At the first surface of the substrate 108, electrodes 122 are provided as terminals for electrical connection of the substrate 108.

The cover plate 114 is provided with openings 124 communicating with the supply channels 104 and openings (not shown) communicating with the collection channels 106. The liquid is supplied to the liquid ejection head 100 through the openings 124, and the liquid is collected from the liquid ejection head 100 through the openings communicating with the collection channels 106. Thus, in the liquid ejection head 100, the liquid is supplied to the pressure chambers 102 after passing through the openings 124, the supply channels 104, and the supply ports 116. Also, the liquid supplied to the pressure chambers 102 is collected after passing through the collection ports 118, the collection channels 106, and the openings communicating with the collection channels 106.

The flow channel formation member 112 forms, together with the substrate 108, liquid chambers 126 each of which includes the pressure chambers 102 and is a space where the liquid is retained. The liquid chambers 126 extend in the direction in which the ejection ports 110 are arranged and are formed to correspond to the respective ejection port rows. Inside each liquid chamber 126, a heater row part 200 is provided in the substrate 108, the heater row part 200 including the heat operation parts 120 and configurations for maintaining the functions of the heat operation parts 120. In the present embodiment, three liquid chambers 126 are provided in the liquid ejection head 100; thus, three heater row parts 200*a*, 200*b*, 200*c* are formed in the substrate 108 (see FIG. 2).

Figure 3A:
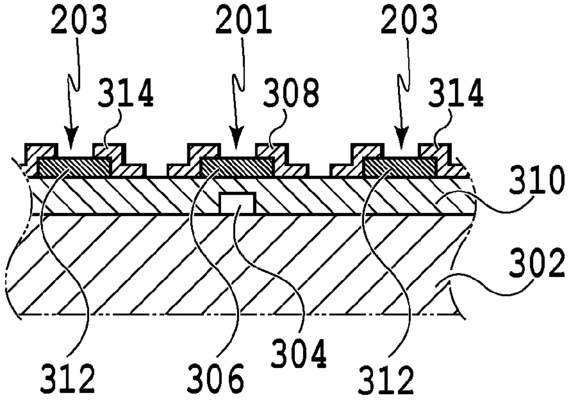
FIGS. 3A and 3B are diagrams showing the configuration of part of the liquid ejection head substrate.
Figure 3B:
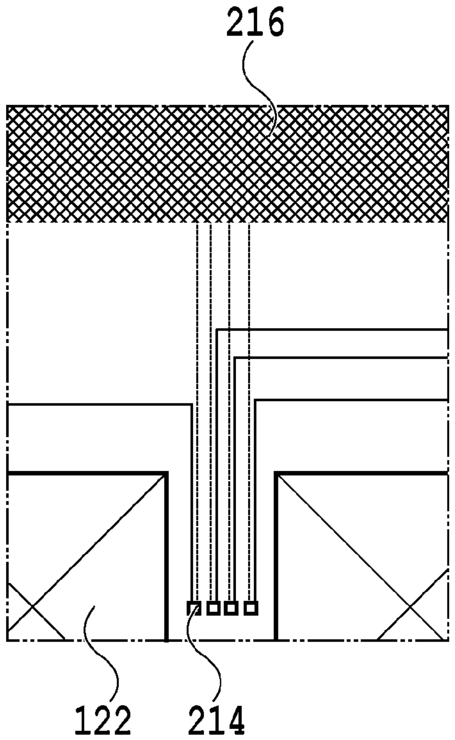

In each heater row part 200, the upper electrodes 201 are formed to cover the heating resistor elements 304 in the heat operation parts 120 from immediately above (see FIGS. 2 and 3A). Specifically, each heater row part 200 includes an upper electrode part 202 where a plurality of upper electrodes 201 are formed. In this upper electrode part 202, the upper electrodes 201 are arranged in the direction in which the ejection ports 110 are arranged.

Also, in each liquid chamber 126, counter electrodes 203 are formed to correspond to the upper electrodes 201 (see FIGS. 2 and 3A). Specifically, each heater row part 200 includes, at each side of the upper electrode part 202, a counter electrode part 204 where a plurality of counter electrodes 203 are formed. The counter electrode parts 204 extend parallel to the upper electrode part 202, and the counter electrodes 203 are arranged parallel to the direction in which the ejection ports 110 are arranged.

The upper electrode part 202 is formed by an interconnection 306 and a protection layer 308 (see FIG. 3A). Specifically, at the substrate 108, an insulating layer 310 is formed on an insulating layer 302 having the heating resistor element 304 formed on the upper surface thereof. Then, on the insulating layer 310, the interconnection 306 is provided, extending in the direction in which the ejection ports 110 are arranged and covering the plurality of heating resistor elements 304 provided at positions corresponding to the respective ejection ports 110. The interconnection 306 is covered by the protection layer 308 in such a manner that regions located immediately above the heating resistor elements 304 are open. Then, the opening regions of the interconnection 306 uncovered by the protection layer 308 serve as the upper electrodes 201.

The counter electrode parts 204 provided to correspond to the upper electrode part 202 are configured such that, in the liquid ejection head, the counter electrodes 203 are electrically connectable to the upper electrodes 201 of the upper electrode part 202 via the liquid retained in the liquid chamber 126. Specifically, each counter electrode part 204 is formed by an interconnection 312 and a protection layer 314 (see FIG. 3A). Specifically, the interconnections 312 are provided on the insulating layer 310, extending in the direction in which the ejection ports 110 are arranged (in FIG. 3A, a direction perpendicular to the paper plane) with a predetermined space being interposed therebetween in a direction intersecting with (in the present embodiment, orthogonal to) the arrangement direction. The interconnection 312 is covered by the protection layer 314 in such a manner that regions corresponding to the upper electrodes 201 are open. Then, the opening regions of the interconnection 312 uncovered by the protection layer 314 serve as the counter electrodes 203.

Via a pattern 210, the interconnections 306 are connected to through-hole technologies (THTs) 214 (see FIG. 3B) connected to the electrodes 122. Also, via patterns 212, the interconnections 312 are connected to the THTs 214. The THTs 214 are connected to a voltage generating part 216 which is a circuit for generating voltages to be applied to the upper electrode parts 202 and the counter electrode parts 204 (see FIG. 3B). Thus, in the present embodiment, the voltage generating part 216 provided on the substrate 108 applies voltages to the upper electrode parts 202 via the THTs 214 and the pattern 210, thereby applying a voltage to each of the upper electrodes 201. Also, the voltage generating part 216 applies voltages to the counter electrode parts 204 via the THTs 214 and the patterns 212, thereby applying a voltage to each of the counter electrodes 203. In this way, in the present embodiment, the voltage generating part 216 functions as a generation part that generates voltages to be applied to the upper electrode parts 202 and the counter electrode parts 204.

Note that the THTs 214 are disposed near the electrodes 122. The electrodes 122 are sealed by a sealing material so as not to come into contact with the liquid. Thus, sealing the THTs 214 using the sealing material for the electrodes 122 enables inhibition of increase in the size of the substrate 108 and reduction of sealing failure or the like, thereby avoiding decrease in the reliability of the performance of the substrate 108.

The interconnections 306 used for the upper electrode parts 202 are formed of a material that can be eluted into the liquid retained in the liquid chamber 126 through an electrochemical reaction. Also, the interconnections 312 used for the counter electrode parts 204 are formed of a material that causes an electrochemical reaction to take place between the upper electrodes 201 and the liquid retained in the liquid chamber 126 and thus elutes the upper electrodes 201 into the liquid. For example, the interconnections 312 are formed of the same material as the interconnections 306. Also, the interconnections 306 and the interconnections 312 are formed of a conductive material. The upper electrodes 201 need to have a function to protect the heating resistor elements 304 from physical and chemical impacts and to have thermal conductivity to transfer the heat generated by the heating resistor element 304 to the liquid instantaneously. For the interconnections 306 and the interconnections 312, any of various publicly-known substances may be used as long as the material meets the above-described conditions. In the present embodiment, the interconnections 306 and the interconnections 312 are formed of, for example, iridium (Ir). Note that the interconnections 306 and the interconnections 312 are not limited to being formed of the same material and may be formed of materials different from each other.

The upper electrodes 201 are electrodes formed in such a manner as to cover the heating resistor elements 304 with the insulating layer 310 interposed therebetween. During the execution of processing of liquid ejection from the liquid ejection head 100, the upper electrodes 201 function as negative electrodes so as to mainly repel anions in the liquid. This makes it less likely for koge derived from the liquid to attach to the upper electrodes 201 during the liquid ejection processing. Also, setting the upper electrodes 201 to have a high potential relative to the counter electrodes 203 enables the upper electrodes 201 to be eluted into the liquid and also enables removal of koge derived from the liquid and attached to the upper electrodes 201.

During the execution of processing of liquid ejection from the liquid ejection head 100, the counter electrodes 203 function as positive electrodes so as to keep anions in the liquid away from the upper electrodes 201. To remove koge attached to the upper electrodes 201, a voltage is applied to between the upper electrodes 201 and the counter electrodes 203 via the liquid so that the upper electrodes 201 may have a higher potential than the counter electrodes 203. This causes an electrochemical reaction to take place between the upper electrodes 201 to sustain the reaction for eluting the upper electrodes 201 into the liquid. As a result, currents flow from the upper electrodes 201 to the counter electrodes 203 via the liquid.

Specifically, a voltage to a degree such that the counter electrodes 203 are not eluted is applied to the counter electrode parts 204, and a voltage of 0 V is applied to the upper electrodes 201, in order to suppress koge by removing or dispersing a liquid component on the upper electrodes 201. Also, a voltage that causes the upper electrodes 201 to be eluted is applied to the upper electrode parts 202, and a voltage of 0V is applied to the counter electrodes 203, in order to remove koge attached onto the upper electrodes 201 by eluting the upper electrodes 201 into the liquid.

Figure 4:
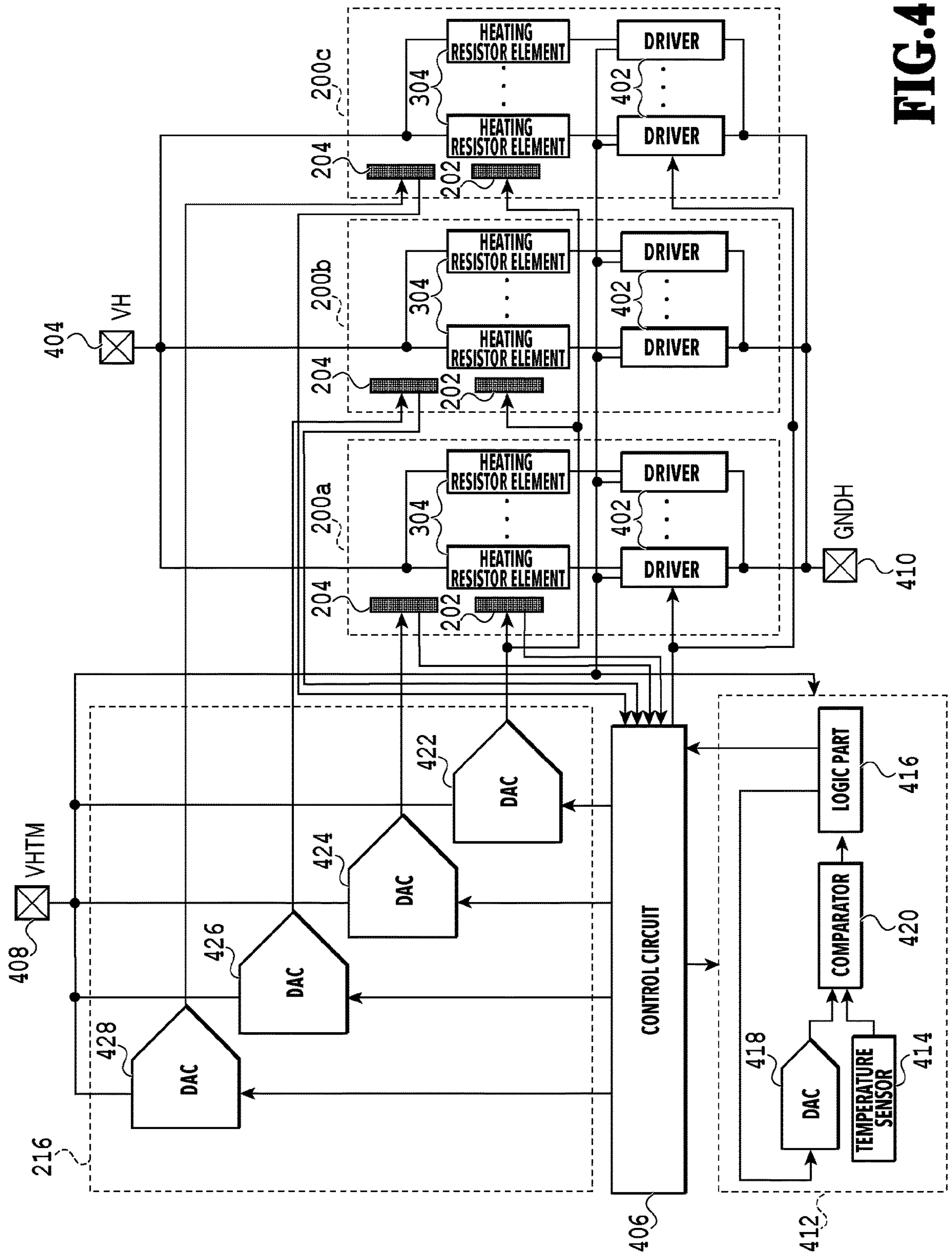
FIG. 4 is a circuit diagram of the liquid ejection head substrate.
Figure 5:
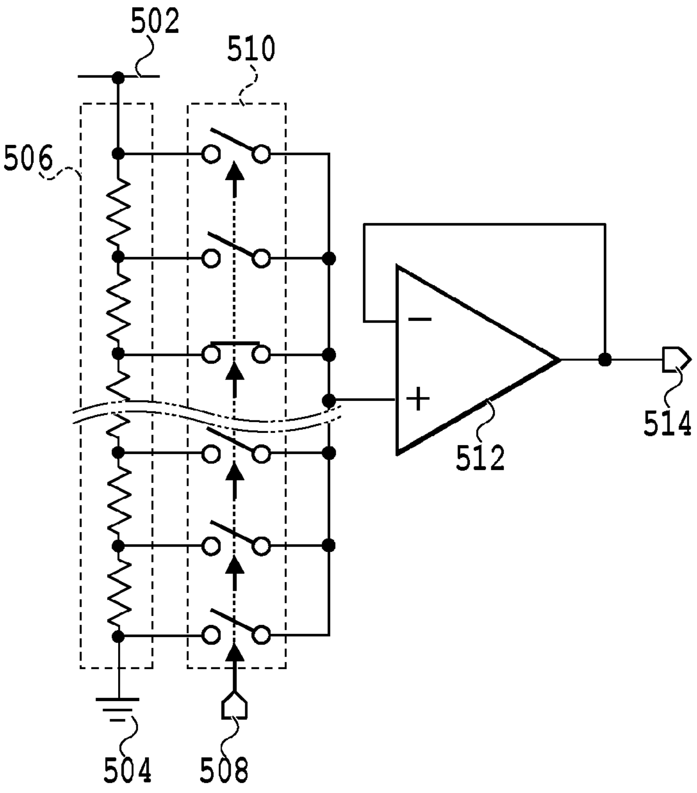
FIG. 5 is a circuit diagram of a DAC.

Next, the circuitry configuration of the substrate 108 is described. FIG. 4 is a circuit diagram of the liquid ejection head substrate 108 of the first embodiment. FIG. 5 is a circuit diagram of a DAC in FIG. 4. In the substrate 108, the heating resistor elements 304 are connected to respective drivers 402 that control driving of the heating resistor elements 304 and to a 24-V VH 404 connected to the electrodes 122. The drivers 402 are connected to a control circuit 406, a 5-V VHTM 408 connected to the electrodes 122, the respective heating resistor elements 304, and a 0-V GNDH 410 connected to the electrodes 122. Based on a control signal from the control circuit 406, each driver 402 drives the corresponding heating resistor element 304 after increasing its voltage to the voltage of the VHTM 408, i.e., 5 V, to increase the driving capability of the driver 402. The heating resistor element 304 receives the voltage of the VH 404 as driven by the driver 402, and consequently, ink is ejected from the ejection port 110.

The substrate 108 includes a temperature detection part 412 for inhibiting fluctuation of the ejection amount of the liquid due to temperature change. The temperature detection part 412 is formed by a temperature sensor 414 utilizing the temperature characteristics of a diode, a logic part 416, a digital-analog converter (DAC) 418 connected to the VHTM 408, and a comparator 420. The temperature detection part 412 converts an analog temperature value obtained from the temperature sensor 414 into a digital value, and outputs the digital value to the control circuit 406.

As controlled by the control circuit 406, the logic part 416 controls the DAC 418 based on the result of comparison by the comparator 420 between the output values from the temperature sensor 414 and the DAC 418, and outputs a digital temperature value to the control circuit 406. The control circuit 406 transmits, via the electrodes 122, the temperature value outputted thereto to an external control circuit (not shown) provided separately from the substrate 108. In the present embodiment, the temperature detection part 412 and the control circuit 406 are provided at the substrate 108, although they are not shown in FIG. 2. Note that based on, e.g., information outputted from the external control circuit, the control circuit 406 performs various kinds of control of the substrate 108, such as controlling voltages to be applied to the upper electrode parts 202 and the counter electrode parts 204.

The voltage generating part 216 includes DACs 422, 424, 426, 428 controlled by the control circuit 406. The DACs 422, 424, 426, 428 are each connected to the VHTM 408. The DAC 422 is connected to the upper electrode parts 202 of the heater row parts 200*a*, 200*b*, 200*c*. The DAC 424 is connected to the counter electrode part 204 of the heater row part 200*a*. The DAC 426 is connected to the counter electrode part 204 of the heater row part 200*b*. The DAC 428 is connected to the counter electrode part 204 of the heater row part 200*c*.

Each of the DACs 422 to 428 is, at its output port, connected to the control circuit 406 via the upper electrode part 202 or the counter electrode part 204 to which the DAC is connected. Output values from the DACs 422 to 428 are outputted to the control circuit 406 and are then outputted to the external control circuit via the electrodes 122. Note that the DACs 422 to 428 may be connected to the control circuit 406 before being connected to the upper electrode parts 202 or the counter electrode parts 204.

The DAC 418 and the DACs 422 to 428 have a circuit configuration shown in FIG. 5. Each DAC divides the voltage between a power supply 502 and a ground 504 using resistors 506, selects a predetermined division location at the resistors 506 with selectors 510 in accordance with an input signal 508 which is a digital value, and outputs an analog value to a terminal 514 via an amplifier 512. In other words, each DAC outputs a voltage of a predetermined value based on the input signal 508 outputted from the control circuit 406. Although the resistance division method is used for the DACs which are digital-analog converters in the present embodiment, the present invention is not limited to this. Specifically, the present invention may employ any of various publicly-known methods, such as the R-2R method or the capacitance division method.

In the above configuration, during the execution of processing involving liquid ejection from the liquid ejection head 100, the control circuit 406 controls and sets voltages such that a voltage of 0 V is applied to the DAC 422, and a voltage of a predetermined value such as, for example, 0.5 V is applied to the DACs 424, 426, 428. In other words, the control circuit 406 outputs, to the DACs 424, 426, 428, the input signal 508 for applying the voltage of the predetermined value described above. Note that the predetermined value is determined according to, e.g., the kind of the liquid ejected from the liquid chamber 126 through the ejection ports 110 and materials for the interconnection 306 forming the upper electrodes 201 and the interconnection 312 forming the counter electrodes 203. Also, the predetermined value is a value that allows efficient suppression of attachment of koge to the upper electrodes 201. Consequently, the upper electrodes 201 function as negative electrodes, and the counter electrodes 203 function as positive electrodes, so that koge derived from the liquid is less likely to attach to the upper electrodes 201 during the execution of the above-described processing.

Also, to remove koge attached to the upper electrodes 201, the control circuit 406 controls and sets voltages such that a voltage of a predetermined value such as, for example, 2 V is applied to the DAC 422, and a voltage of 0 V is applied to the DACs 424, 426, 428. In other words, the control circuit 406 outputs, to the DAC 422, the input signal 508 for applying the voltage of the predetermined value described above. Note that the predetermined value is determined according to, e.g., the kind of the liquid ejected from the liquid chamber 126 through the ejection ports 110 and materials for the interconnection 306 forming the upper electrodes 201 and the interconnection 312 forming the counter electrodes 203. Also, the predetermined value is a value that allows efficient removal of attachment of koge from the upper electrodes 201. Consequently, the upper electrodes 201 function as positive electrodes, and the counter electrodes 203 function as negative electrodes, so that the upper electrodes 201 are eluted into the liquid, thereby removing koge attached to the upper electrodes 201.

As thus described, in the substrate 108 of the present embodiment, predetermined voltages can be applied to the upper electrode part 202 and the counter electrode part 204 of each the heater row part 200 from the voltage generating part 216 provided on the substrate 108. This enables the interconnections from the voltage generating part to the upper electrode parts 202 and to the counter electrode parts 204 to be shorter than those in a technique in which voltages are applied from a voltage generating part which is an external configuration provided separately from the substrate 108. This consequently makes it less likely for a voltage drop to occur in the interconnections connecting the voltage generating part to the upper electrode parts 202 and to the counter electrode parts 204 and therefore enables voltages of intended values to be applied to the upper electrodes 201 and the counter electrodes 203 with high precision.

Also, the DACs 424, 426, 428 are respectively connected to the counter electrode parts 204 of the different heater row parts 200. For this reason, in a case where the liquid ejection head 100 is configured to eject different kinds of liquid from the ejection ports 110 communicating with the liquid chambers 126 including the different heater row parts 200, voltages of values suitable for suppressing koge can be applied to the counter electrode parts 204 according to the respective kinds of the liquid. This enables the liquid ejection head 100 to suppress koge efficiently.

Also, in a case where voltages of different values are applied to the counter electrode parts 204 in a configuration of a publicly-known technique where voltages are applied from an external voltage generating part, each heater row part needs to be provided with an electrode for connecting to the voltage generating part. By contrast, the substrate 108 of the present embodiment does not need to be provided with such electrodes, which inhibits increase in the size of the substrate 108 and also eliminates the need for sealing such electrodes, so that the reliability of the performance of the substrate can be maintained.

Second Embodiment

Figure 6:
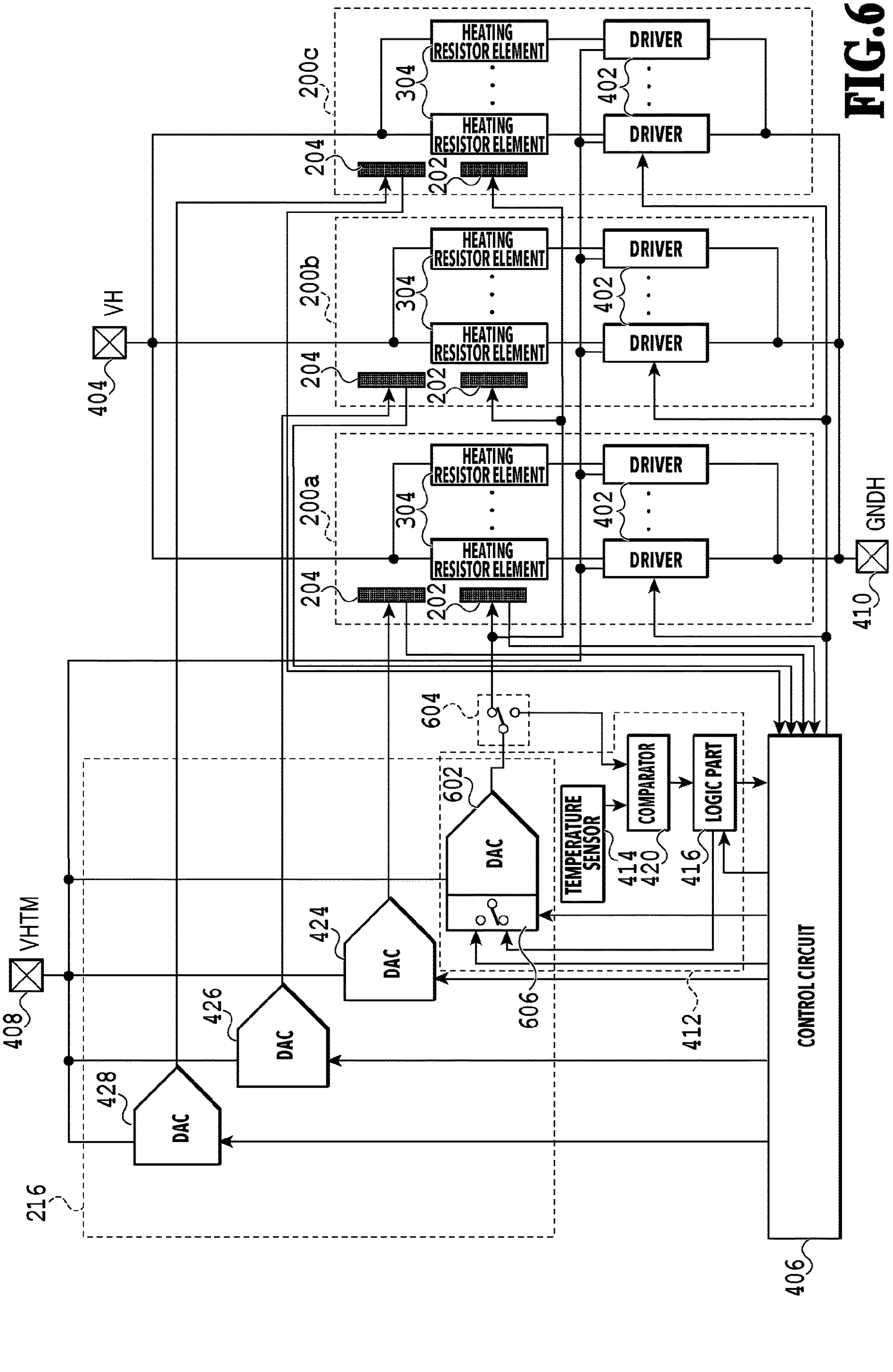
FIG. 6 is a circuit diagram of a liquid ejection head substrate.

Next, with reference to FIG. 6, a description is given of a liquid ejection head substrate of a second embodiment. Note that in the following description, configurations which are the same as or correspond to those in the liquid ejection head substrate of the first embodiment are denoted by the same reference numerals as those used in the first embodiment to omit their detailed descriptions.

The second embodiment differs from the first embodiment in having a configuration in which one of the DACs of the voltage generating part 216 is also used by the temperature detection part 412.

FIG. 6 is a circuit diagram of the liquid ejection head substrate 108 of the second embodiment. In the present embodiment, the voltage generating part 216 of the substrate 108 includes a DAC 602 as a configuration for applying a voltage to the upper electrode parts 202. Note that the DAC 602 is connected in such a manner that the DAC 602 is also usable by the temperature detection part 412.

Specifically, the DAC 602 is, at its output port, connected to a switching part 604. The switching part 604 is configured to allow the DAC 602 to be selectively connected to the upper electrode parts 202 of the heater row parts 200 or the comparator 420 used in the temperature detection part 412. Also, the DAC 602 is, at its input port, connected to a switching part 606. The switching part 606 is configured to allow the control circuit 406 or the logic part 416 used in the temperature detection part 412 to be selectively connected to the DAC 602. Note that the switching parts 604, 606 select the connection destinations as controlled by the control circuit 406.

To apply a voltage to the upper electrode parts 202 of the heater row parts 200*a*, 200*b*, 200*c*, the switching part 606 connects the control circuit 406 to the DAC 602, and the switching part 604 connects the DAC 602 to the upper electrode parts 202. Also, to cause the temperature detection part 412 to function, the switching part 606 connects the logic part 416 to the DAC 602, and the switching part 604 connects the DAC 602 to the comparator 420.

As thus described, the substrate 108 of the present embodiment is configured such that a DAC in the voltage generating part 216 for applying a voltage to the upper electrode parts 202 of the heater row parts 200 is also usable by the temperature detection part 412. This can achieve reduction in the size of the substrate 108, in addition to the operations and advantageous effects described in the first embodiment.

Although the DAC in the voltage generating part 216 also used by the temperature detection part 412 is the DAC connected to the upper electrode parts 202 in the present embodiment, the present invention is not limited to this. Specifically, the DAC also used by the temperature detection part 412 may be any one of the three DACs in the voltage generating part 216 that are connected to the counter electrode parts 204. Also, although the DAC in the voltage generating part 216 is also used by the temperature detection part 412 here, the present invention is not limited to this. Specifically, the substrate 108 may be configured such that a DAC in the voltage generating part 216 is also used by another configuration having a DAC that is provided at the substrate 108.

Third Embodiment

Figure 7:
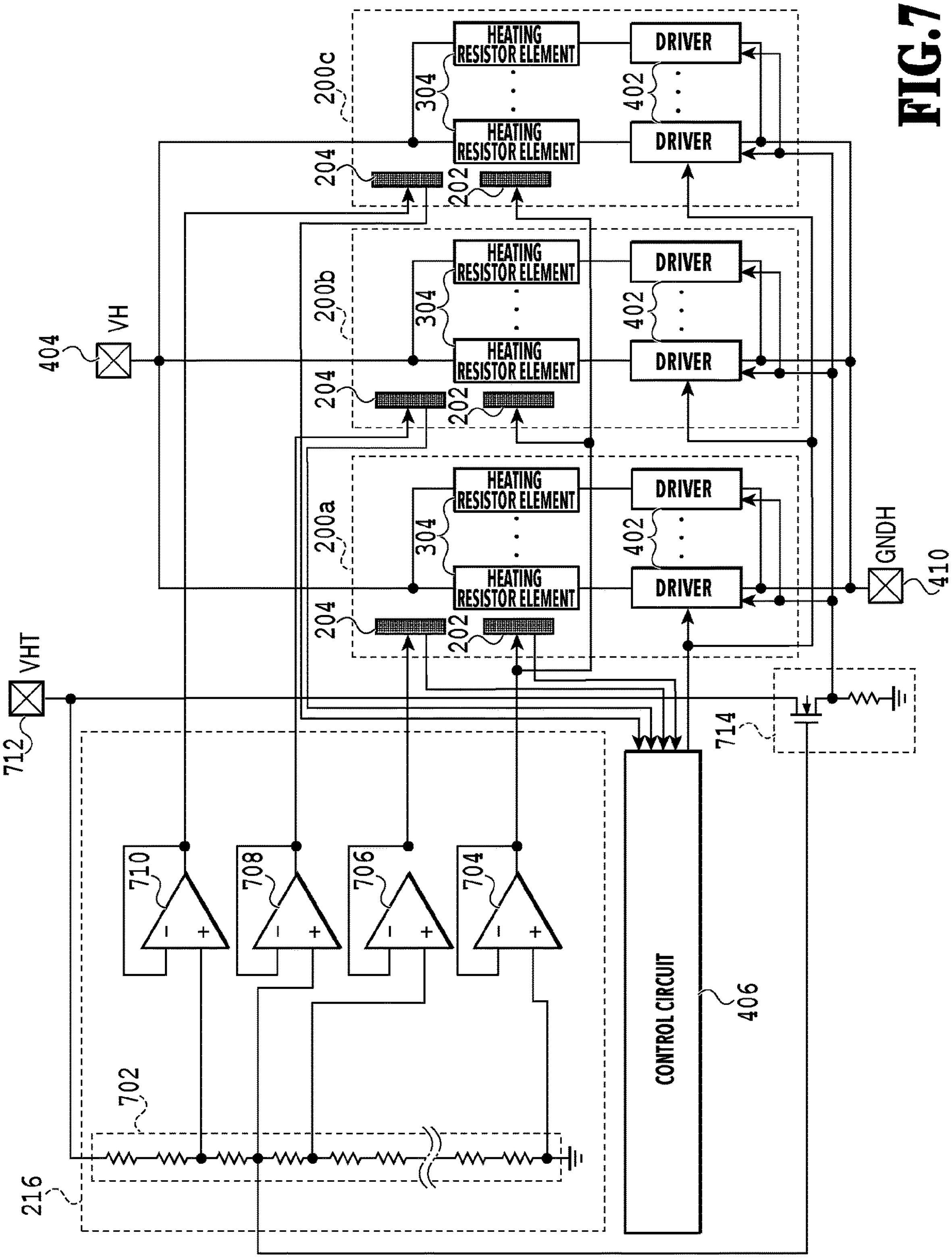
FIG. 7 is a circuit diagram of a liquid ejection head substrate.

Next, with reference to FIG. 7, a description is given of a liquid ejection head substrate of a third embodiment. Note that in the following description, configurations which are the same as or correspond to those in the liquid ejection head substrate of the first embodiment are denoted by the same reference numerals as those used in the first embodiment to omit their detailed descriptions.

The third embodiment differs from the first embodiment in that the voltage generating part 216 applies voltages taken out using resistance voltage division to the upper electrode parts 202 and the counter electrode parts 204.

FIG. 7 is a circuit diagram of the liquid ejection head substrate 108 of the third embodiment. Note that FIG. 7 does not show the configuration of the temperature detection part 412 to facilitate understanding. In the present embodiment, the voltage generating part 216 of the substrate 108 includes a resistor array 702 and amplifiers 704, 706, 708, 710 that amplify outputs from the resistor array 702. The resistor array 702 is connected to a 24-V VHT 712 connected to the electrodes 122. The VHT 712 is connected to a source-follower VHT buffer 714. The VHT 712 inputs a voltage taken out from the resistor array 702 to the VHT buffer 714 to supply a 5-V drive voltage to the drivers 402.

The amplifier 704 is connected to the upper electrode parts 202 of the heater row parts 200, and the amplifier 706 is connected to the counter electrode part 204 of the heater row part 200*a*. The amplifier 708 is connected to the counter electrode part 204 of the heater row part 200*b*, and the amplifier 710 is connected to the counter electrode part 204 of the heater row part 200*c*. Thus, outputs from the resistor array 702 are amplified by the amplifiers and inputted to the upper electrode parts 202 or the counter electrode parts 204.

Each of the amplifiers 704 to 710 is, at its output port, connected to the control circuit 406 via the upper electrode part 202 or the counter electrode part 204 to which the amplifier is connected. Output values of the amplifiers 704 to 710 are outputted to the control circuit 406 and are then outputted to the external control circuit via the electrodes 122. Note that the amplifiers 704 to 710 may be connected to the control circuit 406 before being connected to the upper electrode parts 202 or the counter electrode parts 204.

As thus described, in the substrate 108 of the present embodiment, the voltage generating part 216 uses the resistor array 702 to apply desired voltages to the upper electrode parts 202 and the counter electrode parts 204. Thus, operations and advantageous effects similar to those described in the first embodiment can be offered.

Although the resistor array 702 is used in the present embodiment to apply voltages to the upper electrode parts 202 and the counter electrode parts 204 using the resistance division method, the present invention is not limited to this. Specifically, any of various publicly-known techniques, such as the capacitance division method, may be used to apply voltages to the upper electrode parts 202 and the counter electrode parts 204. Also, although the VHT buffer 714 is shared in the present embodiment, a different part may be shared instead.

Fourth Embodiment

Figure 8:
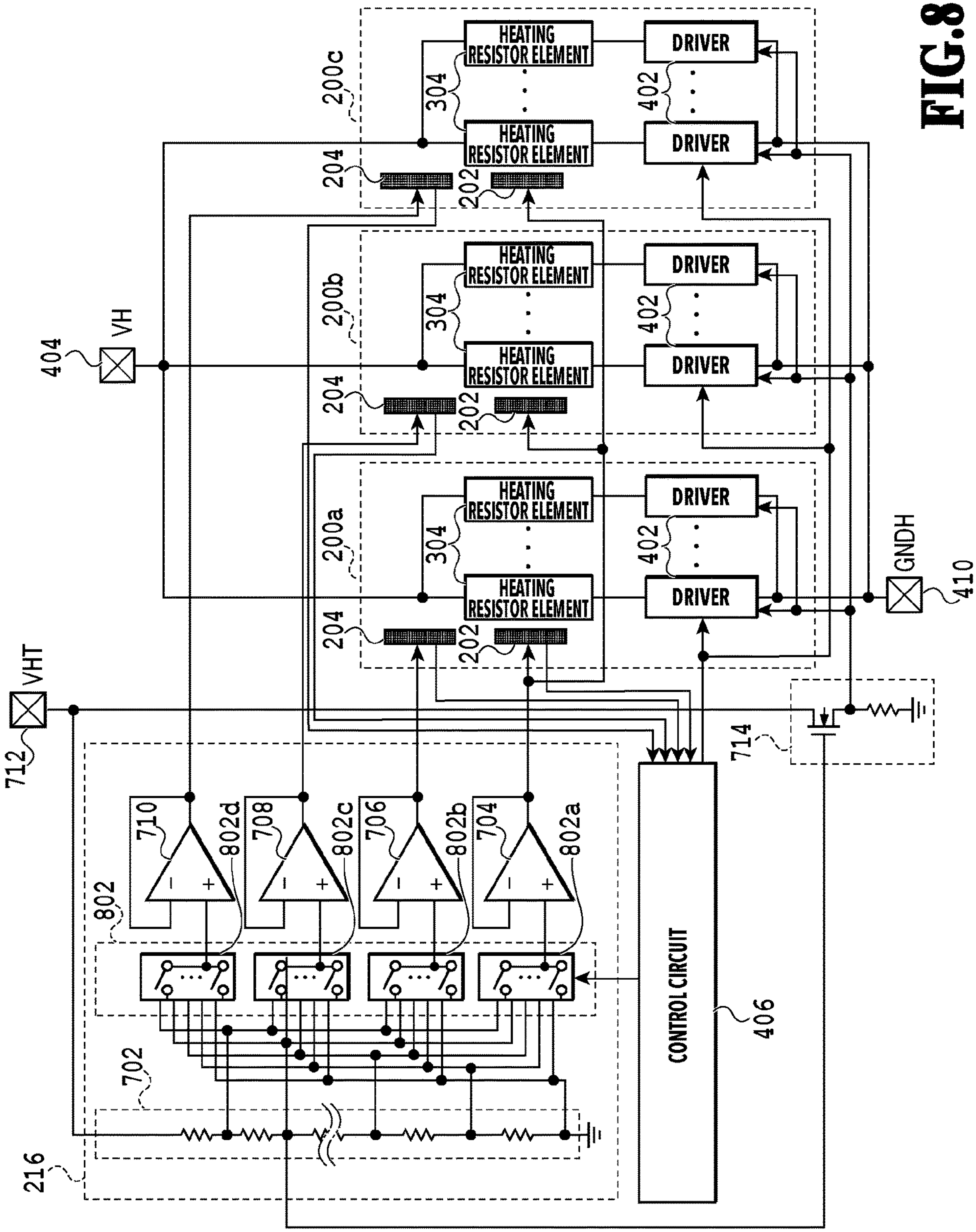
FIG. 8 is a circuit diagram of a liquid ejection head substrate.

Next, with reference to FIG. 8, a description is given of a liquid ejection head substrate of a fourth embodiment.

Note that in the following description, configurations which are the same as or correspond to those in the liquid ejection head substrate of the first and third embodiments are denoted by the same reference numerals as those used in the first and third embodiments to omit their detailed descriptions.

The fourth embodiment differs from the first embodiment in that the voltage generating part 216 applies voltages taken out using resistance voltage division to the upper electrode parts 202 and the counter electrode parts 204. Also, the fourth embodiment differs from the third embodiment in including a selecting part capable of selectively connecting a voltage taken out using resistance voltage division to the amplifier connected to the upper electrode parts 202 or the counter electrode part 204 to which the voltage is to be applied.

FIG. 8 is a circuit diagram of the liquid ejection head substrate 108 of the fourth embodiment. Note that FIG. 8 does not show the configuration of the temperature detection part 412 to facilitate understanding. In the present embodiment, in the voltage generating part 216 of the substrate 108, the resistor array 702 and the amplifiers 704, 706, 708, 710 are connected to each other via a selecting part 802.

The selecting part 802 includes selecting parts 802*a*, 802*b*, 802*c*, 802*d*. The selecting part 802*a* is connected to the amplifier 704, the selecting part 802*b* is connected to the amplifier 706, the selecting part 802*c* is connected to the amplifier 708, and the selecting part 802*d* is connected to the amplifier 710. Out of the voltages taken out from the resistor array 702, the selecting part 802*a* inputs a voltage to be applied to the upper electrode parts 202 of the respective heater row parts 200 to the amplifier 704. Also, out of the voltages taken out from the resistor array 702, the selecting part 802*b* inputs a voltage to be applied to the counter electrode part 204 of the heater row part 200*a* to the amplifier 706. Further, out of the voltages taken out from the resistor array 702, the selecting part 802*c* inputs a voltage to be applied to the counter electrode part 204 of the heater row part 200*b* to the amplifier 708. Furthermore, out of the voltages taken out from the resistor array 702, the selecting part 802*d* inputs a voltage to be applied to the counter electrode part 204 of the heater row part 200*c* to the amplifier 710.

As thus described, in the substrate 108 of the present embodiment, the voltage generating part 216 uses the resistor array 702 to apply voltages to the upper electrode parts 202 and the counter electrode parts 204. In this event, the selecting part 802 causes voltages of intended values to be applied to the upper electrode parts 202 and the counter electrode parts 204 out of the voltages taken out from the resistor array 702. Thus, operations and advantageous effects similar to those offered by the first embodiment can be offered.

Fifth Embodiment

Figure 9:
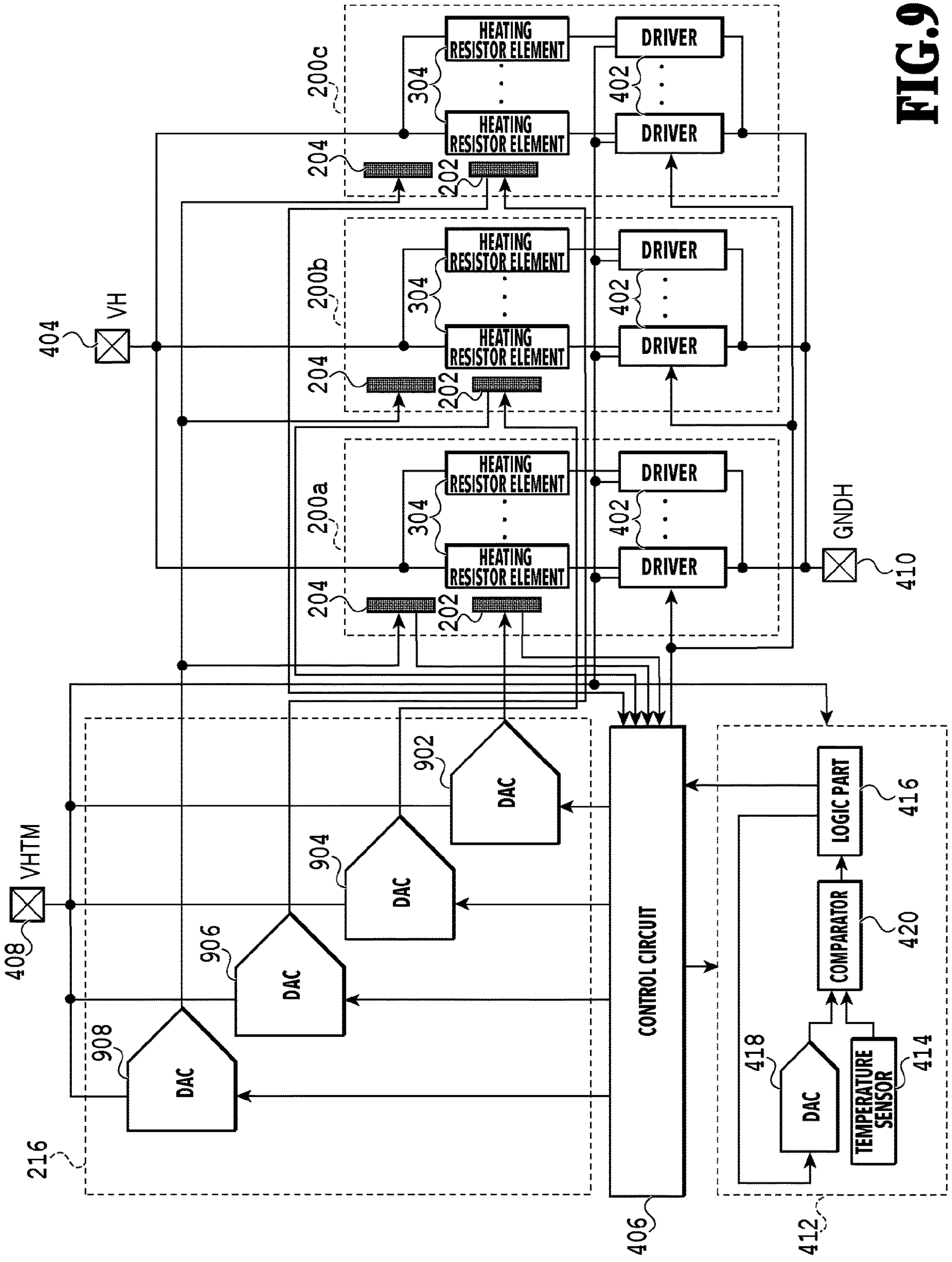
FIG. 9 is a circuit diagram of a liquid ejection head substrate.

Next, with reference to FIG. 9, a description is given of a liquid ejection head substrate of a fifth embodiment. Note that in the following description, configurations which are the same as or correspond to those in the liquid ejection head substrate of the first embodiment are denoted by the same reference numerals as those used in the first embodiment to omit their detailed descriptions.

The fifth embodiment differs from the first embodiment in the following points. Specifically, in the substrate 108, voltages are applied to the counter electrode parts 204 of the respective heater row parts 200 from the same DAC in the voltage generating part 216. Also, voltages are applied to the upper electrode parts 202 of the respective heater row part 200 from different DACs in the voltage generating part 216.

FIG. 9 is a circuit diagram of the liquid ejection head substrate 108 of the fifth embodiment. In the present embodiment, the voltage generating part 216 includes DACs 902, 904, 906, 908 controlled by the control circuit 406. The DACs 902, 904, 906, 908 are each connected to the VHTM 408. The DAC 902 is connected to the upper electrode part 202 of the heater row part 200*a*. The DAC 904 is connected to the upper electrode part 202 of the heater row part 200*b*. The DAC 906 is connected to the upper electrode part 202 of the heater row part 200*c*. The DAC 908 is connected to the counter electrode parts 204 of the heater row parts 200*a*, 200*b*, 200*c*.

Each of the DACs 902 to 908 is, at its output port, connected to the control circuit 406 via the upper electrode part 202 or the counter electrode part 204 to which the DAC is connected. Output values from the DACs 902 to 908 are outputted to the control circuit 406 and are then outputted to the external control circuit via the electrodes 122. Note that the DACs 902 to 908 may be connected to the control circuit 406 before being connected to the upper electrode parts 202 or the counter electrode parts 204. Like the DAC 418, the DACs 902, 904, 906, 908 each have a circuit configuration shown in FIG. 5.

In the configuration thus described, during the execution of processing involving liquid ejection from the liquid ejection head 100, the control circuit 406 controls and sets voltages such that a voltage of 0 V is applied to the DACs 902, 904, 906, and a voltage of a predetermined value such as, for example, 0.5 V is applied to the DAC 908. In other words, the control circuit 406 outputs, to the DAC 908, the input signal 508 for the application of the voltage of the predetermined value. Note that the predetermined value is determined based on, e.g., the kind of liquid ejected from the liquid chambers 126 through the ejection ports 110 and the materials for the interconnections 306 forming the upper electrodes 201 and the interconnections 312 forming the counter electrodes 203. Also, the predetermined value is a value that allows efficient suppression of attachment of koge to the upper electrodes 201. As a result, the upper electrodes 201 function as negative electrodes, and the counter electrodes 203 function as positive electrodes, so that koge derived from the liquid is less likely to attach to the upper electrodes 201 during the execution of the above-described processing.

Also, to remove koge attached to the upper electrode 201, the control circuit 406 controls and sets voltages such that a voltage of a predetermined value such as, for example, 2 V is applied to the DACs 902, 904, 906, and a voltage of 0 V is applied to the DAC 908. In other words, the control circuit 406 outputs, to the DACs 902, 904, 906, the input signal 508 for the application of the voltage of the predetermined value. Note that the predetermined value is determined based on, e.g., the kind of liquid ejected from the liquid chambers 126 through the ejection ports 110 and the materials for the interconnections 306 forming the upper electrodes 201 and the interconnections 312 forming the counter electrodes 203. Also, the predetermined value is a value that allows efficient suppression of attachment of koge to the upper electrodes 201. Consequently, the upper electrodes 201 function as positive electrodes, and the counter electrodes 203 function as negative electrodes, so that the upper electrodes 201 are eluted into the liquid, thereby removing koge attached to the upper electrodes 201.

As thus described, in the substrate 108 of the present embodiment, predetermined voltages can be applied to the upper electrode parts 202 and the counter electrode parts 204 of the heater row parts 200 from the voltage generating part 216 provided on the substrate 108. Thus, like in the first embodiment, voltages of intended values can be applied to the upper electrodes 201 and the counter electrodes 203 with high precision.

Also, the DACs 902, 904, 906 are respectively connected to the upper electrode parts 202 of the different heater row parts 200. For this reason, in a case where the liquid ejection head 100 is configured to eject different kinds of liquid from the ejection ports 110 communicating with the liquid chambers 126 including the different heater row parts 200, voltages of values suitable for suppressing koge can be applied to the upper electrode parts 202 according to the respective kinds of the liquid. This enables the liquid ejection head 100 to remove koge efficiently.

Also, in a case where voltages of different values are applied to the upper electrode parts 202 in a configuration of a publicly-known technique where voltages are applied from an external voltage generating part, each of the heater row parts needs to be provided with an electrode for connecting to the voltage generating part. By contrast, the substrate 108 of the present embodiment does not need to be provided with such electrodes, which inhibits increase in the size of the substrate 108 and also eliminates the need for sealing the electrodes, so that the reliability of the performance of the substrate is less likely to decrease.

Sixth Embodiment

Figure 10:
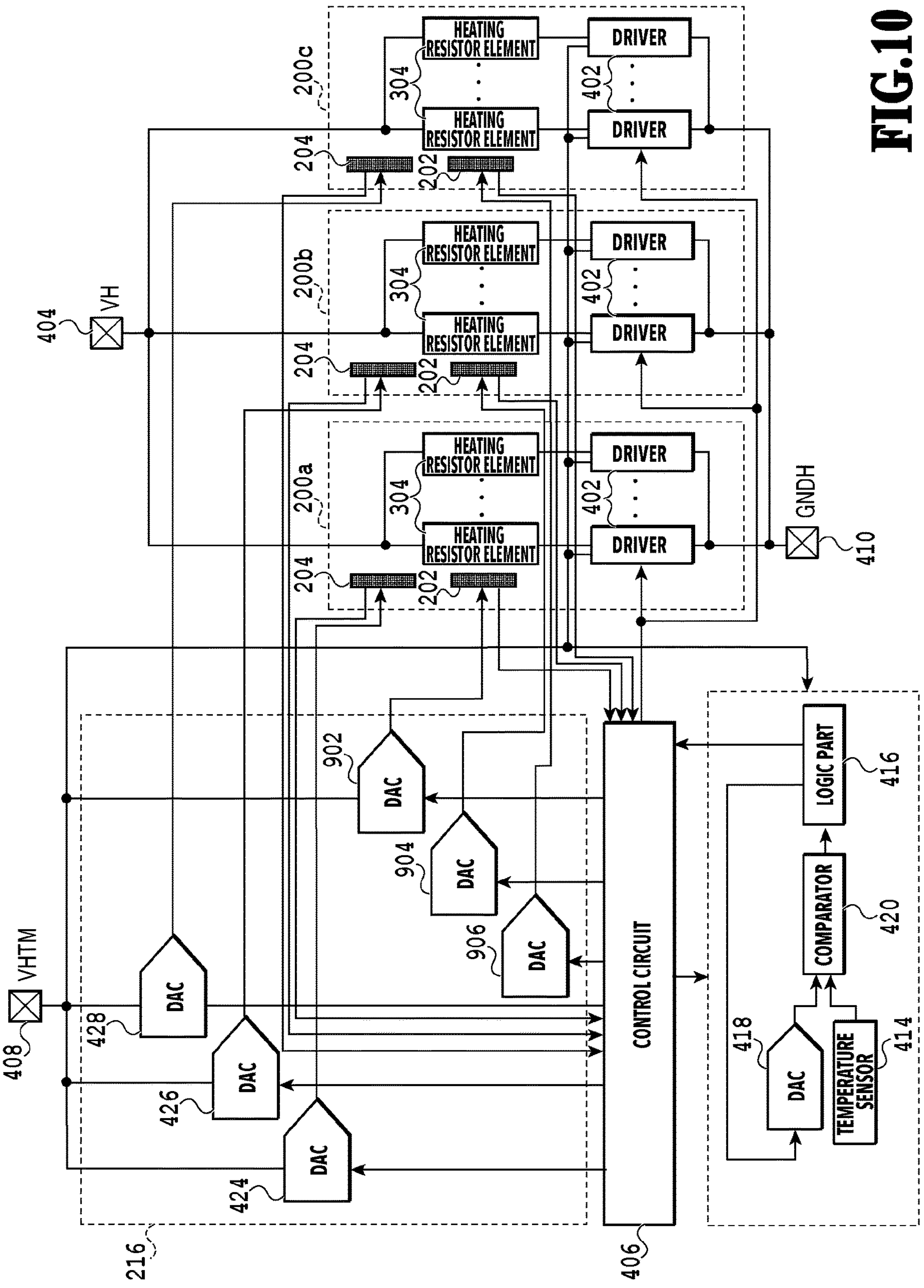
FIG. 10 is a circuit diagram of a liquid ejection head substrate.

Next, with reference to FIG. 10, a description is given of a liquid ejection head substrate of a sixth embodiment. Note that in the following description, configurations which are the same as or correspond to those in the liquid ejection head substrate of the first and fifth embodiments are denoted by the same reference numerals as those used in the first and fifth embodiments to omit their detailed descriptions.

The sixth embodiment differs from the first and fifth embodiments in that voltages are applied to the upper electrode parts 202 and the counter electrode parts 204 of the heater row parts 200 from different DACs in the voltage generating part 216.

FIG. 10 is a circuit diagram of the liquid ejection head substrate 108 of the sixth embodiment. In the present embodiment, the voltage generating part 216 includes DACs 424, 426, 428, 902, 904, 906 connected to the VHTM 408.

Specifically, for the heater row part 200*a*, the DAC 902 applies a voltage to the upper electrode part 202, and the DAC 424 applies a voltage to the counter electrode part 204. Also, for the heater row part 200*b*, the DAC 904 applies a voltage to the upper electrode part 202, and the DAC 426 applies a voltage to the counter electrode part 204. Further, for the heater row part 200*c*, the DAC 906 applies a voltage to the upper electrode part 202, and the DAC 428 applies a voltage to the counter electrode part 204.

In the configuration thus described, in a case of a configuration in which, for example, different kinds of liquid are ejected from the ejection ports 110 communicating with the liquid chambers 126 including the different heater row parts 200, control can be performed as follows.

During the execution of processing involving liquid ejection from the liquid ejection head 100, the control circuit 406 controls and sets voltages such that a voltage of 0 V is applied to the DACs 902, 904, 906, a voltage of 0.5 V is applied to the DAC 424, a voltage of 0.6 V is applied to the DAC 426, and a voltage of 0.7 V is applied to the DAC 428. Note that the voltage values set for the DACs 424, 426, 428 are each a value that allows efficient suppression of attachment to the upper electrodes 201 of koge derived from the liquid to be ejected. In this way, voltages suitable for suppression of koge are applied to the counter electrode parts 204 according to the respective kinds of the liquid. Consequently, the upper electrodes 201 function as negative electrodes, and the counter electrodes 203 function as positive electrodes, so that koge can be suppressed efficiently.

Also, to remove koge attached to the upper electrode part 202, the control circuit 406 controls and sets voltages such that a voltage of 2 V is applied to the DAC 902, a voltage of 2.4 V is applied to the DAC 904, a voltage of 2.8 V is applied to the DAC 906, and a voltage of 0 V is applied to the DACs 424, 426, 428. Note that the voltage values set for the DACs 902, 904, 906 are each a value that allows koge derived from the liquid to be ejected to be efficiently removed from the upper electrodes 201. In this way, voltages suitable for removal of koge are applied to the upper electrode parts 202 according to the respective kinds of the liquid. Consequently, the upper electrodes 201 function as positive electrodes, and the counter electrodes 203 function as negative electrodes, so that koge can be removed efficiently.

As thus described, in the substrate 108 of the present embodiment, different voltages can be applied individually to the upper electrode parts 202 and the counter electrode parts 204 of the heater row parts 200 from the voltage generating part 216 provided on the substrate 108. Thus, operations and advantageous effects similar to those offered by the fifth embodiment can be offered in addition to the operations and advantageous effects similar to those offered by the first embodiment.

Seventh Embodiment

Figure 11:
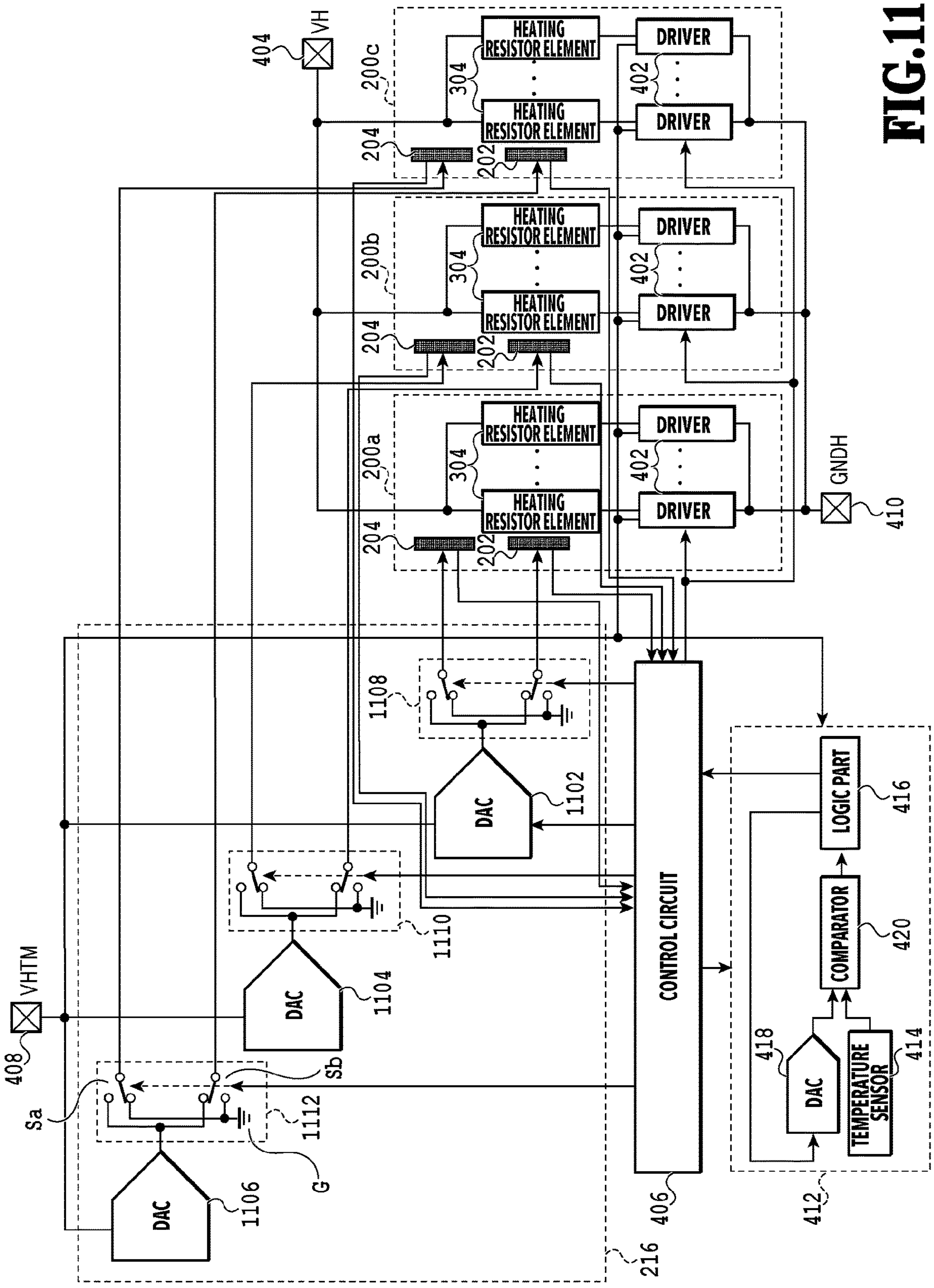
FIG. 11 is a circuit diagram of a liquid ejection head substrate.

Next, with reference to FIG. 11, a description is given of a liquid ejection head substrate of a seventh embodiment. Note that in the following description, configurations which are the same as or correspond to those in the liquid ejection head substrate of the first embodiment are denoted by the same reference numerals as those used in the first embodiment to omit their detailed descriptions.

The seventh embodiment differs from the first embodiment in that the voltage generating part 216 includes DACs each capable of selectively applying a voltage to the upper electrode part 202 and the counter electrode part 204 in the corresponding heater row part 200.

FIG. 11 is a circuit diagram of the liquid ejection head substrate 108 of the seventh embodiment. In the present embodiment, the voltage generating part 216 includes DACs 1102, 1104, 1106 controlled by the control circuit 406. The DACs 1102, 1104, 1106 are each connected to the VHTM 408. The DAC 1102 is selectively connectable to the upper electrode part 202 or the counter electrode part 204 in the heater row part 200*a* via a switching part 1108. The DAC 1104 is selectively connectable to the upper electrode part 202 or the counter electrode part 204 in the heater row part 200*b* via a switching part 1110. The DAC 1106 is selectively connectable to the upper electrode part 202 or the counter electrode part 204 in the heater row part 200*c* via a switching part 1112.

As controlled by the control circuit 406, the switching parts 1108, 1110, 1112 select targets to which the DACs 1102, 1104, 1106 apply voltages, respectively. The switching parts 1108, 1110, 1112 have the same configuration. Thus, the following describes the configuration of the switching part 1112, omitting descriptions for the configurations of the switching parts 1108, 1110.

The switching part 1112 includes two switch parts Sa, Sb. The control circuit 406 controls these switch parts Sa, Sb to select a target to which the DAC 1106 applies a voltage. The switch part Sa selectively connects the counter electrode part 204 to the DAC or a ground G. The switch part Sb selectively connects the upper electrode part 202 to the DAC or the ground G. The control circuit 406 controls the switch parts Sa, Sb to connect the DAC to either the upper electrode part 202 or the counter electrode part 204.

Each of the DACs 1102 to 1106 is, at its output port, connected to the control circuit 406 via the upper electrode part 202 or the counter electrode part 204 to which the DAC is connected. Output values from the DACs 1102 to 1106 are outputted to the control circuit 406 and are then outputted to the external control circuit via the electrodes 122. Note that the DACs 1102 to 1106 may be connected to the control circuit 406 before being connected to the upper electrode part 202 or the counter electrode part 204. Like the DAC 418, the DACs 1102, 1104, 1106 have the circuit configuration shown in FIG. 5.

In the above configuration, during the execution of processing involving liquid ejection from the liquid ejection head 100, the DACs and the switching parts are controlled to set voltages such that a voltage of 0 V is applied to the upper electrode parts 202 and that a voltage of a predetermined value such as, for example, 0.5 V is applied to the counter electrode parts 204. Specifically, in the switching parts 1108, 1110, 1112, the upper electrode parts 202 are connected to the ground G by the switch parts Sb, and the counter electrode parts 204 are connected to the corresponding DACs by the switch parts Sa. Consequently, the upper electrodes 201 function as negative electrodes, and the counter electrodes 203 function as positive electrodes, so that koge derived from the liquid is less likely to attach to the upper electrodes 201 during the execution of the above-described processing.

Also, to remove koge attached to the upper electrode 201, the control circuit 406 controls the switching parts 1108, 1110, 1112 to set voltages such that a voltage of a predetermined value such as, for example, 2 V is applied to the upper electrode parts 202 and a voltage of 0 V is applied to the counter electrode parts 204. Specifically, in the switching parts 1108, 1110, 1112, the upper electrode parts 202 are connected to the corresponding DACs by the switch parts Sb, and the counter electrode parts 204 are connected to the ground G by the switch parts Sa (which is a state shown in FIG. 11). Consequently, the upper electrode 201 function as positive electrodes, and the counter electrodes 203 function as negative electrodes, so that the upper electrodes 201 are eluted into the liquid, thereby removing koge attached to the upper electrodes 201.

As thus described, the substrate 108 of the present embodiment is configured such that a voltage of a predetermined value can be applied to the upper electrode part 202 or the counter electrode part 204 in each heater row part 200 from the voltage generating part 216 provided on the substrate 108. Consequently, operations and advantageous effects similar to those offered by the sixth embodiment can be offered.

Eighth Embodiment

Figure 12A:
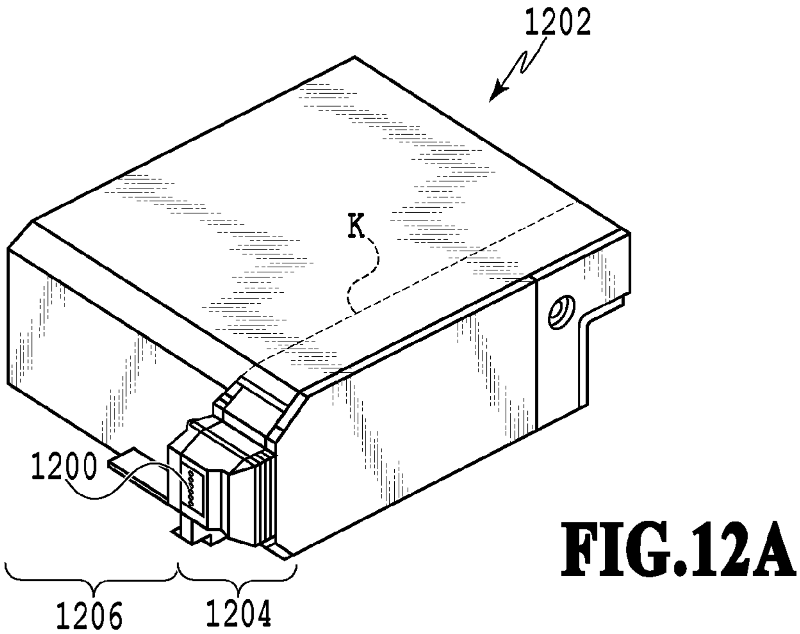
FIGS. 12A and 12B are diagrams illustrating a recording apparatus including the liquid ejection head.
Figure 12B:
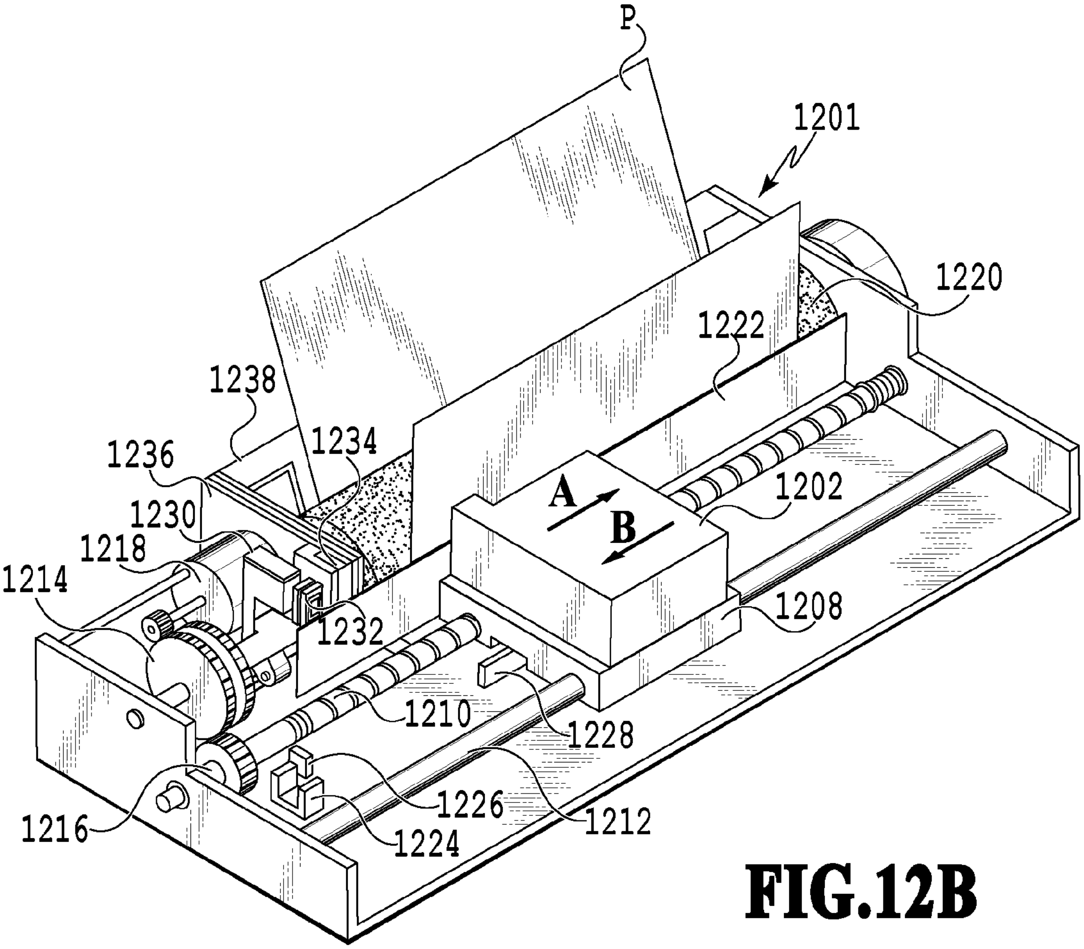

Next, with reference to FIGS. 12A and 12B, a description is given of a liquid ejection apparatus including a liquid ejection head employing the liquid ejection head substrate of the embodiments described above. Note that in the following description, configurations which are the same as or correspond to those in the liquid ejection head substrates of the embodiments described above are denoted by the same reference numerals as those used in the embodiments to omit their detailed descriptions.

As an example of a liquid ejection apparatus, the present embodiment describes an inkjet recording apparatus that records information on a recording medium by ejecting ink thereto by using the inkjet method. Thus, a liquid ejection head is referred to as a recording head in the following description. Note that the inkjet recoding apparatus may be a single-function printer having only a recording capability or a multi-function printer having various capabilities in addition to the recording capability, such as a scanner capability.

In the following description, the term "recording" includes not only forming a visualized form of, e.g., an image, a design, a pattern, or a structure on a recording medium so that it can be visually perceived by humans, but also processing a medium. A "recording medium" is not only paper typically used in an inkjet recording apparatus, but also other media to which a recording liquid can be applied, such as cloth, plastic films, metal plates, glass, ceramics, resins, wood materials, or leather. A "recording liquid" includes not only a liquid such as an ink used for forming an image, a design, a pattern, or the like or for processing a recording medium by being applied to the recording medium, but also various treatment liquids used for performing a treatment such as, for example, solidification or insolubilization with respect to the recording liquid applied.

FIG. 12A is a perspective configuration view of a recording part including a recording head employing the liquid ejection head substrate 108 of the embodiments described above. FIG. 12B is a schematic configuration diagram of an inkjet recording apparatus including the recording head in FIG. 12A. Note that the inkjet recording apparatus is also referred to simply as a "recording apparatus" in the following description.

A recording apparatus 1201 includes a recording part 1202 that applies an ink to a recording medium P. The recording part 1202 has: a recording head part 1204 including a recording head 1200 employing the liquid ejection head substrate 108 of the embodiments described above; and an ink tank 1206 attached to the recording head part 1204.

The recording apparatus 1201 includes a carriage 1208 capable of reciprocating in directions intersecting with (in the present embodiment, orthogonal to) the direction in which the recording medium P is conveyed (see FIG. 12B). The carriage 1208 is attached to a leadscrew 1210 having a helical groove formed therein. Rotation of the leadscrew 1210 allows the carriage 1208 to move along a guide 1212 in an arrow A direction and in an arrow B direction. The rotation of the leadscrew 1210 is in conjunction with the rotation of a drive motor 1218 via drive power transmission gears 1214, 1216.

The recording part 1202 is mounted onto this carriage 1208. Thus, via the carriage 1208, the recording part 1202 can reciprocate in directions intersecting with the direction in which the recording medium P is conveyed. Note that the recording part 1202 includes an electrical contact (not shown) for receiving electrical signals from the carriage 1208 in a state of being mounted onto the carriage 1208, and ejects ink through the ejection ports 110 of the recording head 1200 according to the electrical signals received. The carriage 1208 receives the electrical signals from a recording control part (to be described later).

The ink tank 1206 holds ink to be supplied to the recording head part 1204. The recording part 1202 is configured such that the ink tank 1206 and the recording head part 1204 can be decoupled from each other at, for example, the dotted line part K so that the ink tank 1206 can be replaced. The ink tank 1206 has an ink holding member (not shown) which is, for example, fibrous or porous, and ink can be held in this ink holding member.

The recording apparatus 1201 includes a conveyance part (not shown) that conveys the recording medium P. The recording medium P is conveyed onto a platen 1220 by the conveyance part. The recording medium P conveyed onto the platen 1220 is pressed against the platen 1220 by a press plate 1222 throughout the direction in which the carriage 1208 moves. The recording apparatus 1201 also includes photocouplers 1224, 1226 for detecting timing to change the movement direction from the arrow B direction to the arrow A direction and a cap member 1232 that caps and protects the surface of the recording head 1200 where the ejection ports 110 are formed. The recording apparatus 1201 further includes a cleaning blade 1234 that scrapes the surface of the recording head 1200 where the ejection ports 110 are formed (hereinafter also referred to as an "ejection port surface") and is thereby capable of removing matters attached to the surface.

The photocouplers 1224, 1226 can detect a lever 1228 provided to the carriage 1208 at an upstream location in the arrow A direction. Once the photocouplers 1224, 1226 detect the lever 1228, the recording control part switches the rotation direction of the drive motor 1218 to change the direction in which the carriage 1208 moves from the arrow B direction to the arrow A direction. The cap member 1232 is supported by a support member 1230. The cap member 1232 is configured so that its inside can be sucked by a suctioning part (not shown). By the suctioning part being driven with the cap member 1232 capping the recording head 1200, the recording apparatus 1201 can maintain and restore favorable ink ejection from the ejection ports 110.

Any of various publicly-known techniques can be used as the cleaning blade 1234. In the present embodiment, the cleaning blade 1234 is held by a moving member 1236 and is enabled by the moving member 1236 to move in directions intersecting with the direction in which the recording medium P is conveyed and the direction in which the recording part 1202 moves. In performing the above-described cleaning of attached matters, the cleaning blade 1234 is moved by the moving member 1236 to a position where the cleaning blade 1234 can abut against the ejection port surface of the recording part 1202 in motion and removes matters attached to the ejection port surface by utilizing the motion of the recording part 1202. Note that the cleaning blade 1234 and the moving member 1236 are supported by a main body support plate 1238.

The recording apparatus 1201 is provided with the recording control part (not shown). In the recording apparatus 1201, the recording control part controls driving of each of the mechanisms according to externally-supplied electrical signals such as recording data. The recording apparatus 1201 completes recording of information to the recording medium P by alternately repeating recording performed by the recording part 1202 moving along with the carriage 1208 and conveyance of the recording medium P performed by the conveyance part, both as controlled by the recording control part.

The present embodiment has described a case of applying a liquid ejection head employing the liquid ejection head of the embodiments described above to a recording apparatus that records information onto a recording medium, but the present invention is not limited to this. Specifically, the liquid ejection head employing the liquid ejection head substrate of the embodiments described above may be applied to a three-dimensional modeling apparatus that fabricates a three-dimensionally modeled object by ejecting a liquid from the liquid ejection head and, for example, curing a powder material.

Other Embodiments

Note that the embodiments described above may be modified as shown in (1) to (6) below.

Figure 13:
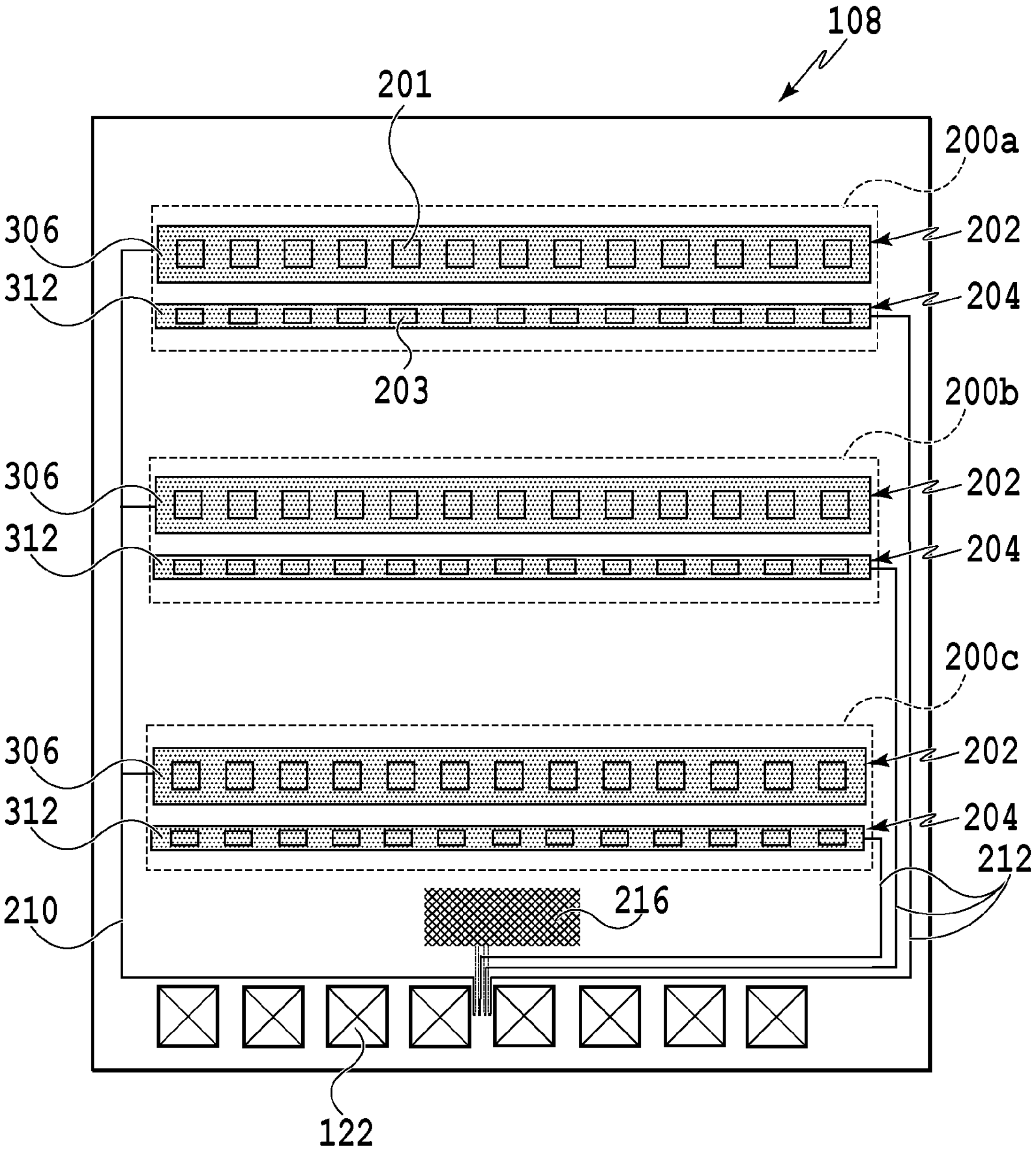
FIG. 13 is a diagram showing a modification of the liquid ejection head substrate.

(1) Although not particularly described in the above embodiments, in regard to an area per upper electrode 201 or counter electrode 203, i.e. an area contactable with the liquid as an electrode, the upper electrode 201 and the counter electrode 203 may have the same area as each other, or the counter electrode 203 may have a smaller area than the upper electrode 201. Also, although a larger number of counter electrodes 203 are provided than the upper electrodes 201 here (see FIG. 2), a fewer number of counter electrodes 203 may be provided. Alternatively, as shown in FIG. 13, the counter electrodes 203 as many as the upper electrodes 201 may be provided on one side of the upper electrode part 202 in terms of a direction intersecting with the direction in which the upper electrode part 202 extends.

(2) Although not particularly described in the first to fourth embodiments, in a case where koge removal is unnecessary, the DACs for applying voltages to the upper electrode parts 202 (or configurations corresponding to them) may be omitted. In this case, instead of the upper electrode parts 202 being connected to the voltage generating part 216 via the THTs 214, an Ir 1402 (an iridium electrode) connected to the electrodes 122 may be connected to the ground outside the substrate 108. The Ir 1402 may be provided at the same layer in the stacking direction as the interconnections 306 forming the upper electrodes 201.

Figure 14A:
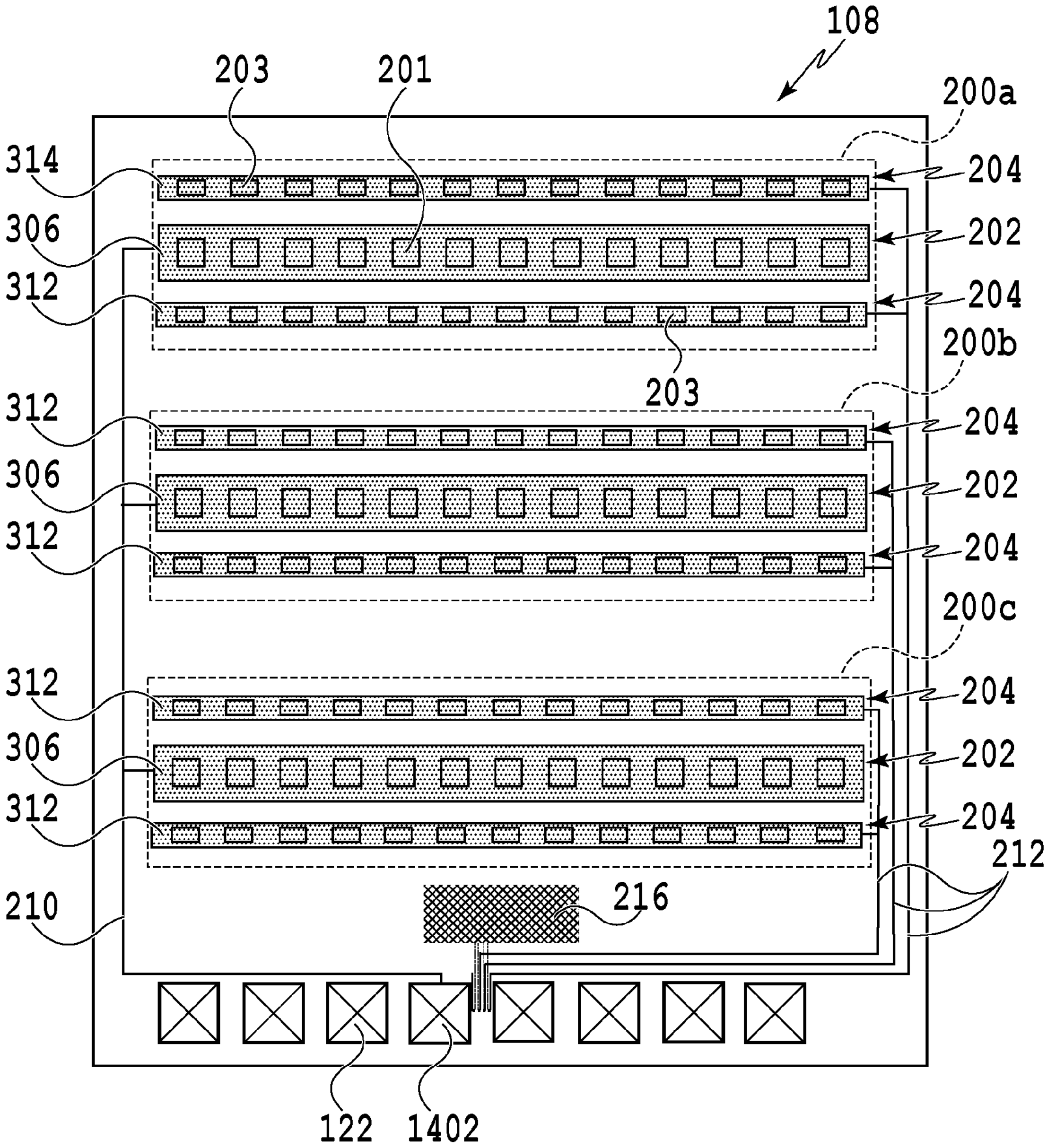
FIGS. 14A and 14B are diagrams showing an example modification of the liquid ejection head substrate.
Figure 14B:
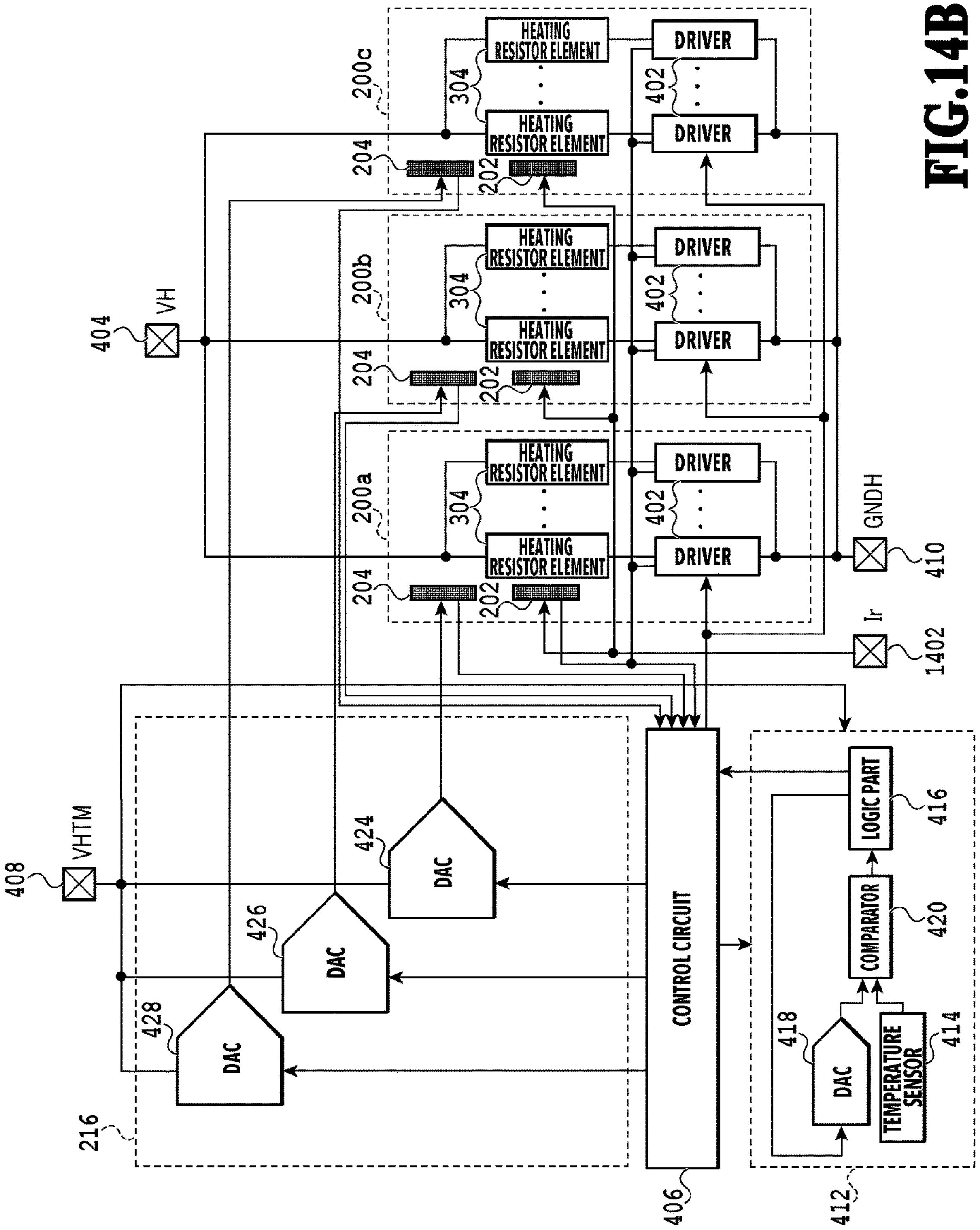

Specifically, for example in the first embodiment, the DAC 422 is omitted, and the upper electrode parts 202 of the respective heater row parts 200 are connected to the Ir 1402 (see FIGS. 14A and 14B). To remove koge in such a configuration, a voltage is applied to the Ir 1402 from outside, and in other situations, the Ir 1402 is connected to the ground outside.

Note that in a case where koge removal is unnecessary as described above, the upper electrodes 201 do not have to be made of a material that can be eluted into a liquid through an electrochemical reaction. The upper electrodes 201 only have to be provided at locations where they come into contact with the liquid and to function as electrodes. In other words, the interconnections 306 forming the upper electrodes 201 may be formed of any material as long as they allow the upper electrodes 201 to function as electrodes.

Also, in a case where suppression of koge is unnecessary in the fifth embodiment, the DAC 908 for applying voltages to the counter electrode parts 204 may be omitted. In this case, instead of being connected to the voltage generating part 216 via the THTs 214, the counter electrode parts 204 may be connected to the ground outside the substrate 108 via the electrodes 122.

(3) Although no particular statement is given in the fifth, sixth, and seventh embodiments, the techniques of the second, third, and fourth embodiments may be applied to these embodiments. Also, although three heater row parts 200 are provided at the substrate 108 in the embodiments described above, the present invention is not limited to this, and the substrate 108 may be provided with one, two, or four or more heater row parts 200. Also, even in a case where the heater row parts 200 eject different kinds of ink, voltages applied to the upper electrode parts 202 and counter electrode parts 204 do not necessarily have to be all different. Specifically, the substrate 108 may be configured so that two different voltages can be applied to two upper electrode parts 202 or two counter electrode parts 204 for ejecting different kinds of ink. Then, the circuit configuration may be such that a common voltage is applied to the upper electrode parts 202 and the counter electrode parts 204 for the other kinds of ink.

(4) Although voltages are applied from the single voltage generating part 216 to the upper electrode parts 202 and the counter electrode parts 204 in the respective heater row parts 200 in the embodiments described above, the present invention is not limited to this. Specifically, voltages may be applied to the upper electrode parts 202 and the counter electrode parts 204 in the respective heater row parts 200 from different voltage generating parts. In this case, the voltage generating parts may be provided for the respective upper electrode parts 202, or a single voltage generating part may be provided for the plurality of upper electrode parts 202. For the counter electrode parts 204, the voltage generating part(s) may be provided in a manner similar to the upper electrode parts 202.

(5) The liquid ejection head employing the liquid ejection head substrate of the embodiments described above is applicable not only to recording apparatuses that record information on a recording medium by ejecting ink, but also broadly to liquid ejection apparatuses that eject various kinds of liquid from the liquid ejection head. Also, in the eighth embodiment, the recording apparatus 1201 is what is called a serial scanning recording apparatus in which the recording part 1202 records information onto the recording medium P conveyed in a predetermined direction while the recording part 1202 is moving in a direction intersecting with the predetermined direction. However, the present invention is not limited to this. Specifically, the recording apparatus 1201 may be what is called a full-line recording apparatus that uses a recording head elongated to cover the entire width direction of the recording region on the recording medium P (the width direction intersecting with the predetermined direction). Also, although the recording apparatus 1201 in the eighth embodiment is what is called a paper-moving recording apparatus that records information onto the recording medium P being conveyed, the present invention is not limited to this. Specifically, the recording apparatus may be what is called a flatbed recording apparatus in which the recording head moves and records information onto the recording medium P placed.

(6) The modes shown in the embodiments and (1) to (5) described above may be combined appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-206568 filed Dec. 14, 2020, which is hereby incorporated by reference wherein in its entirety.

What is claimed is:

1. A liquid ejection head substrate comprising:

electrothermal conversion elements that apply heat to a liquid;

an upper electrode part in which a plurality of upper electrodes that protect the electrothermal conversion elements are formed at positions where the upper electrodes come into contact with the liquid;

a counter electrode part which is provided to correspond to the upper electrode part and in which a plurality of counter electrodes are formed to be electrically connectable to the upper electrodes via the liquid; and a generation unit that generates a voltage to be applied to the upper electrode part and the counter electrode part, wherein a plurality of the upper electrode parts and a plurality of the counter electrode parts are provided, wherein the generation unit comprises a plurality of digital-analog converters which set a voltage to output based on an input signal and applies the voltage to each combination of the upper electrode part and the counter electrode part corresponding to the upper electrode part by using a different one of the digital-analog converters, and wherein the plurality of digital-analog converters selectively apply a voltage to the upper electrode part and the counter electrode part corresponding to each other via a switch unit.

2. The liquid ejection head substrate according to claim 1, wherein the generation unit is connected to the upper electrode part and the counter electrode part via through-hole technologies, and the through-hole technologies are formed near an electrode connectable to an external configuration.

3. The liquid ejection head substrate according to claim 1, wherein the counter electrode part is provided on at least one side of the upper electrode part in a direction intersecting with a direction in which the upper electrode part extends and extends parallel to the upper electrode part with a predetermined gap interposed therebetween.

4. The liquid ejection head substrate according to claim 1, wherein the upper electrodes contain a material capable of being eluted into the liquid through an electrochemical reaction.

5. The liquid ejection head substrate according to claim 1, wherein the upper electrodes and the counter electrodes contain iridium.

6. A liquid ejection head comprising:

a liquid ejection head substrate having electrothermal conversion elements that apply heat to a liquid, an upper electrode part in which a plurality of upper electrodes that protect the electrothermal conversion elements are formed at positions where the upper electrodes come into contact with the liquid, a counter electrode part which is provided to correspond to the upper electrode part and in which a plurality of counter electrodes are formed to be electrically connectable to the upper electrodes via the liquid, and a generation unit that generates a voltage to be applied to at least one of the upper electrode part and the counter electrode part, wherein a plurality of the upper electrode parts and a plurality of the counter electrode parts are provided, wherein the generation unit comprises a plurality of digital-analog converters which set a voltage to output based on an input signal and applies the voltage to each combination of the upper electrode part and the counter electrode part corresponding to the upper electrode part by using a different one of the digital-analog converters, wherein the plurality of digital-analog converters selectively apply a voltage to the upper electrode part and the counter electrode part corresponding to each other via a switch unit, and wherein the liquid ejection head boils the liquid with heat energy exerted by the electrothermal conversion elements, and ejects the liquid from ejection ports with force of bubbles generated by the boiling.

7. A liquid ejection apparatus comprising:

a liquid ejection head substrate having electrothermal conversion elements that apply heat to a liquid, an upper electrode part in which a plurality of upper electrodes that protect the electrothermal conversion elements are formed at positions where the upper electrodes come into contact with the liquid, a counter electrode part which is provided to correspond to the upper electrode part and in which a plurality of counter electrodes are formed to be electrically connectable to the upper electrodes via the liquid, and a generation unit that generates a voltage to be applied to at least one of the upper electrode part and the counter electrode part, wherein a plurality of the upper electrode parts and a plurality of the counter electrode parts are provided, wherein the generation unit comprises a plurality of digital-analog converters which set a voltage to output based on an input signal and applies the voltage to each combination of the upper electrode part and the counter electrode part corresponding to the upper electrode part by using a different one of the digital-analog converters, wherein the plurality of digital-analog converters selectively apply a voltage to the upper electrode part and the counter electrode part corresponding to each other via a switch unit, and wherein the liquid ejection apparatus performs predetermined processing by boiling the liquid with heat energy exerted by the electrothermal conversion elements, and using the liquid ejected with force of bubbles generated by the boiling from a liquid ejection head that ejects the liquid from ejection ports.

8. The liquid ejection apparatus according to claim 7, wherein the liquid is ink, and the liquid ejection head records information by ejecting the ink to a recording medium.

* * * * *